INVENTORS.
HERBERT A. SILVEN
STEWART S. MADER
BY Harold W. Eaton
ATTORNEY

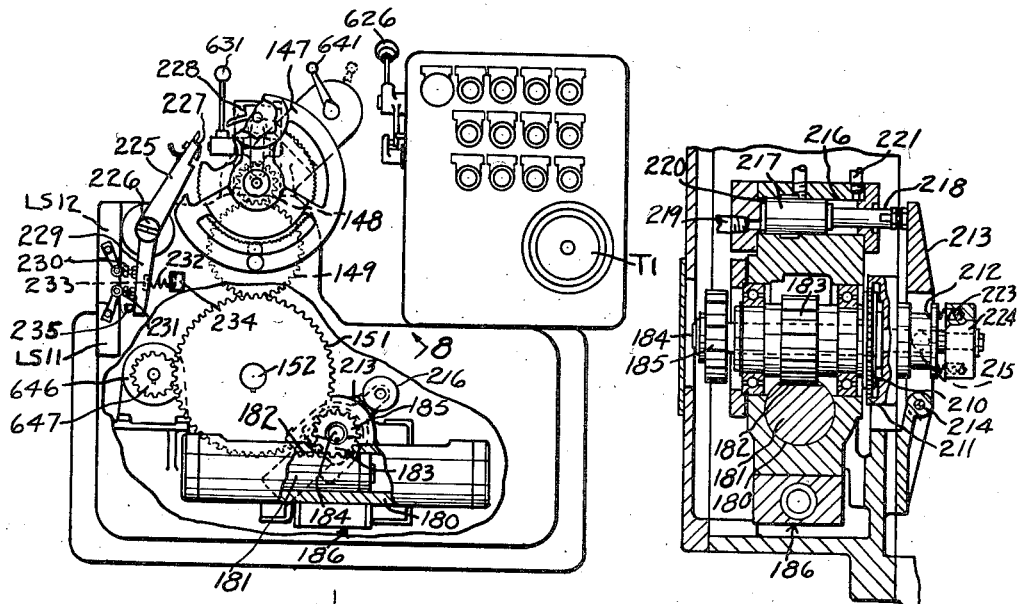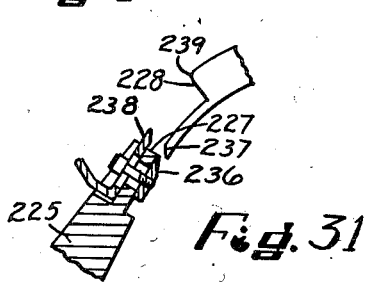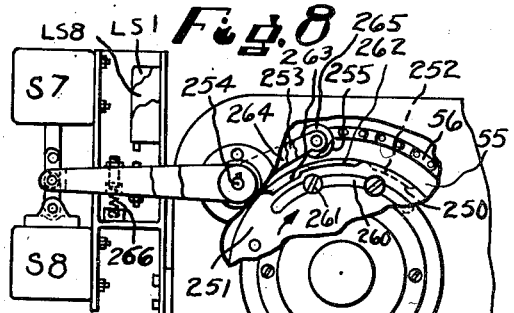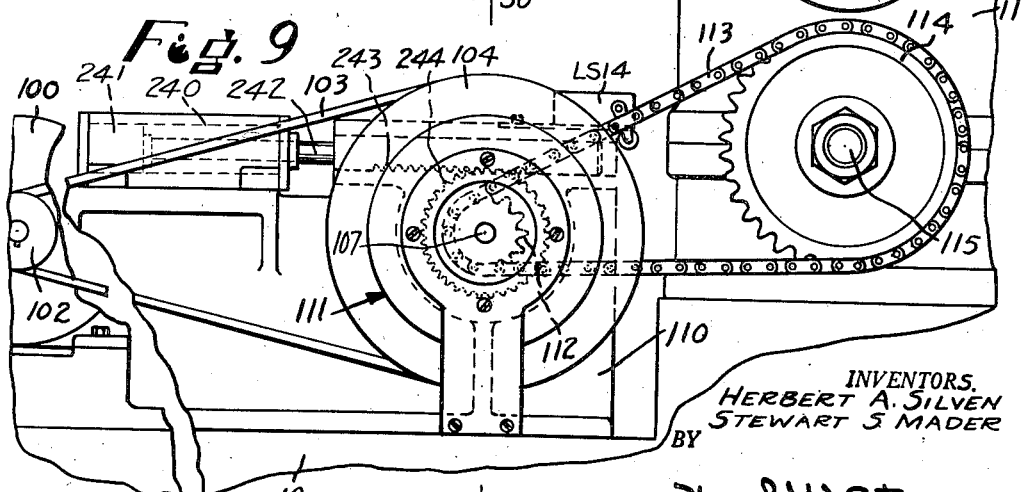

Feb. 12, 1957 H. A. SILVEN ET AL 2,780,895
CRANKPIN GRINDING MACHINE
Filed June 4, 1954 15 Sheets-Sheet 7
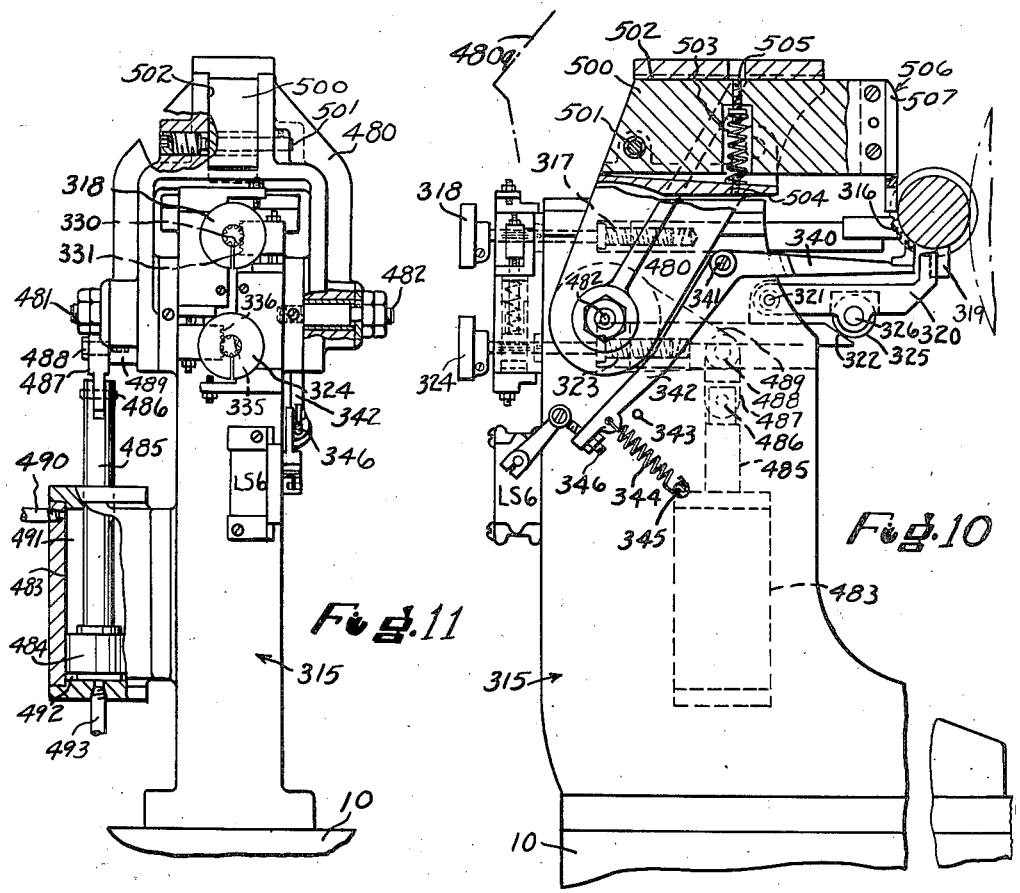
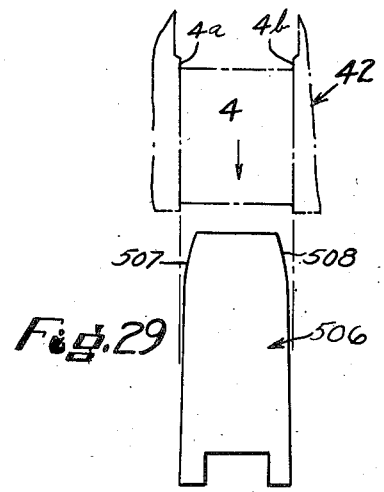
INVENTORS.
HERBERT A. SILVEN
STEWART S. MADER
BY
Harold W. Eaton
ATTORNEY

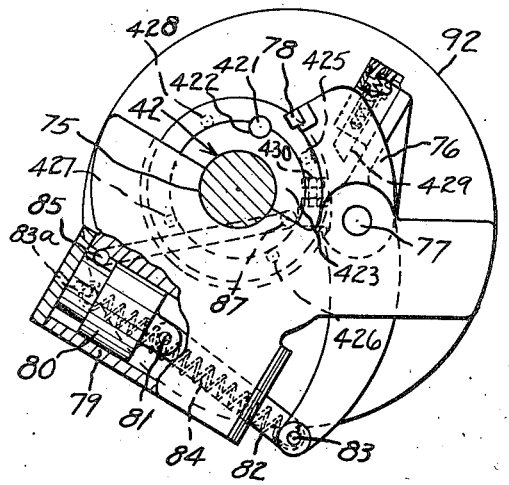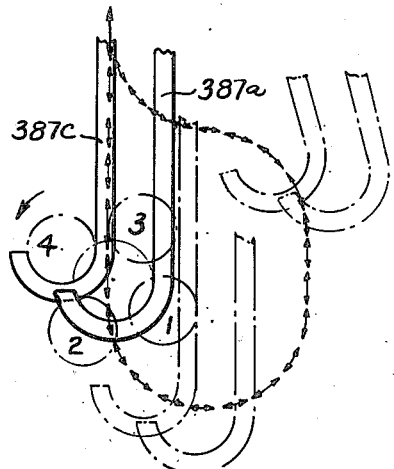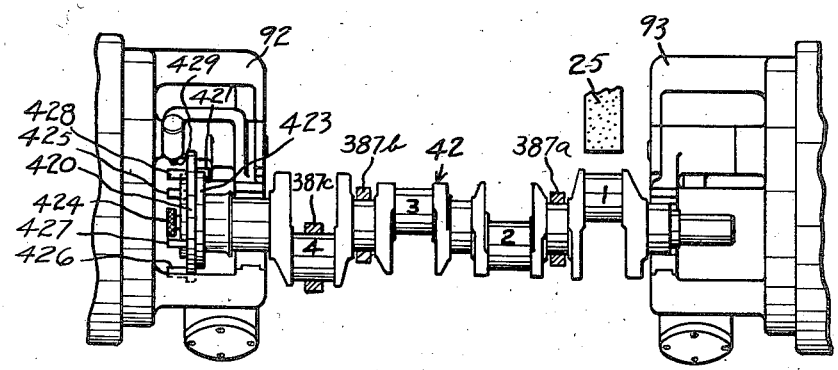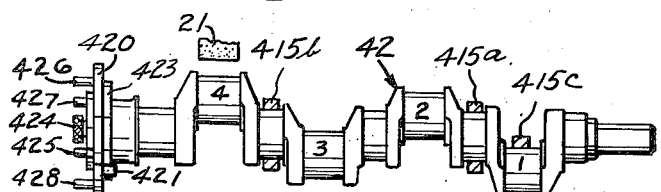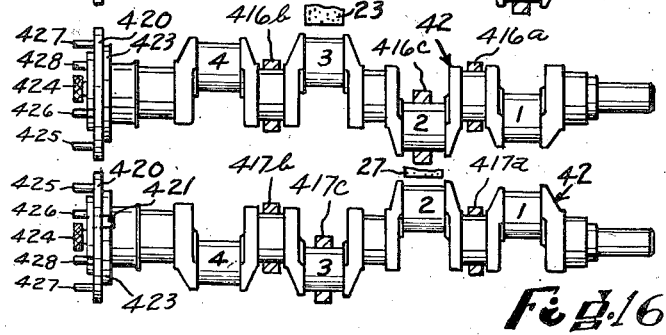

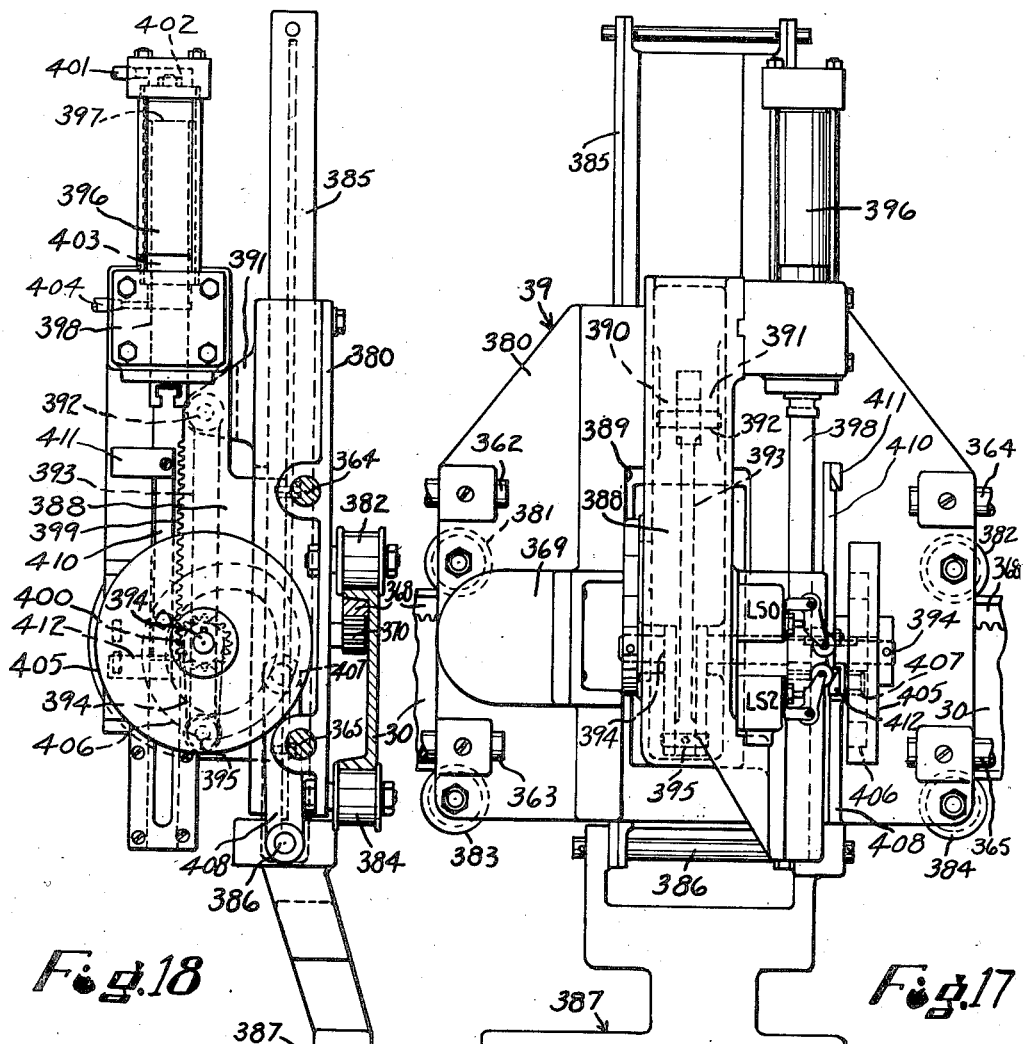

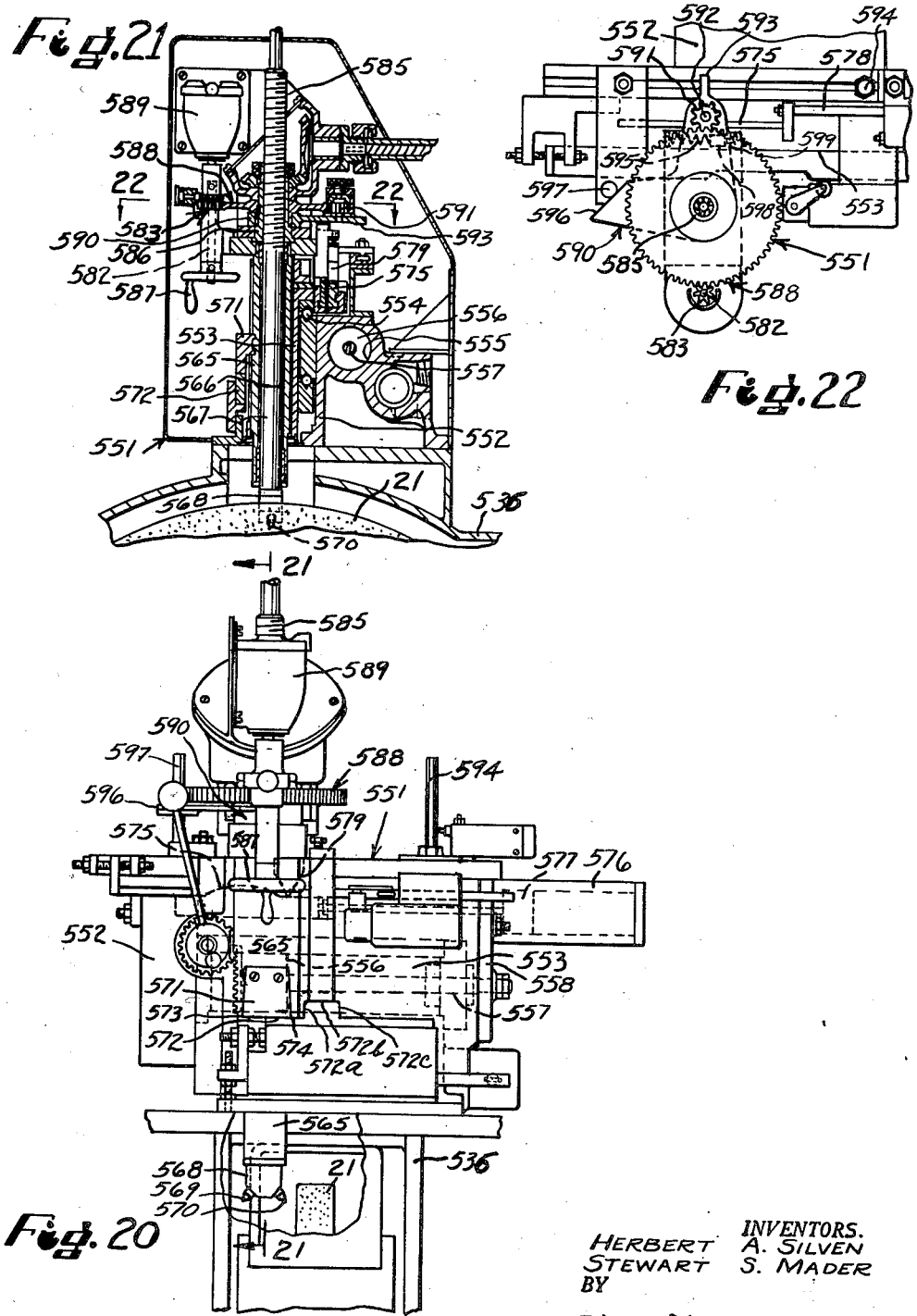

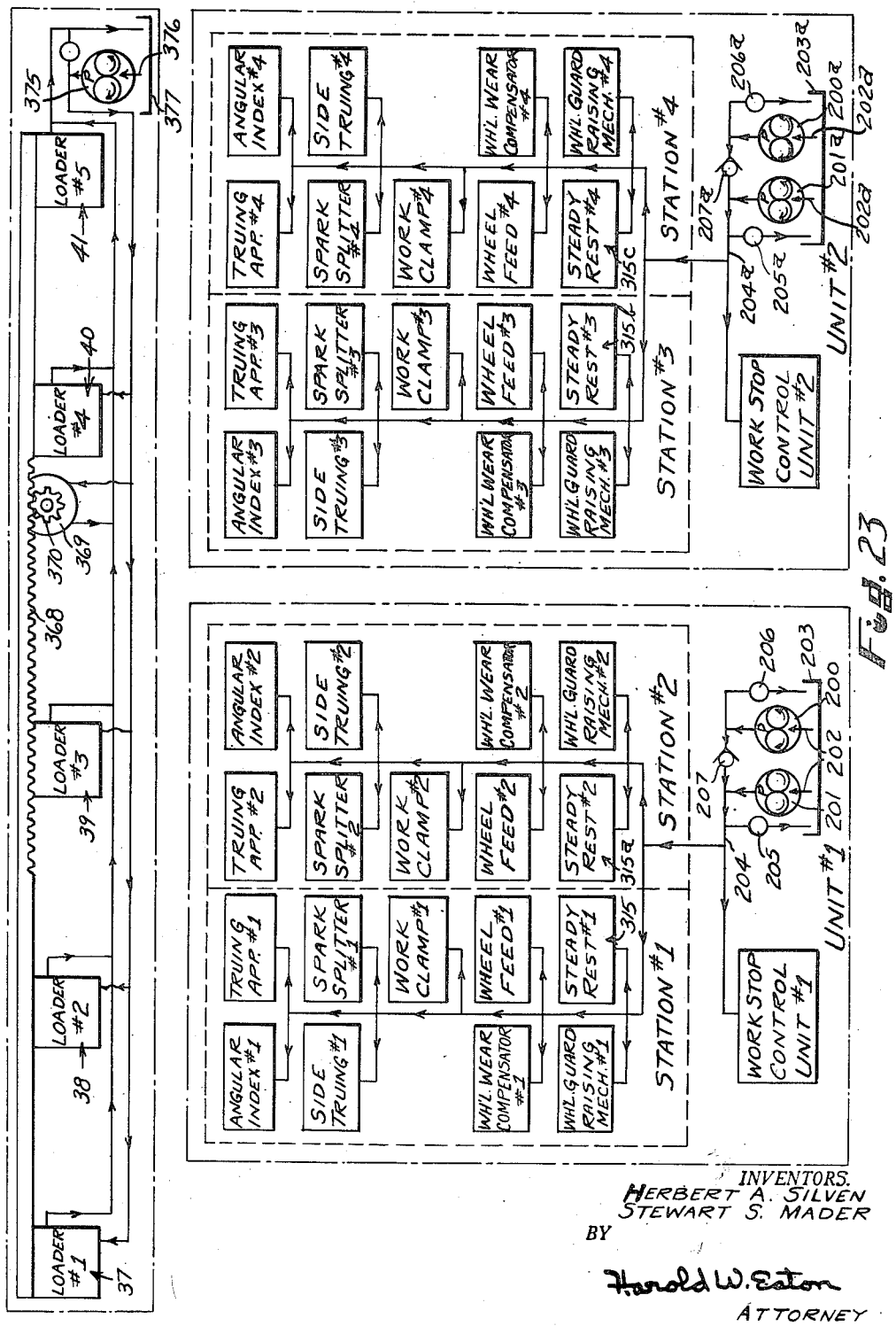

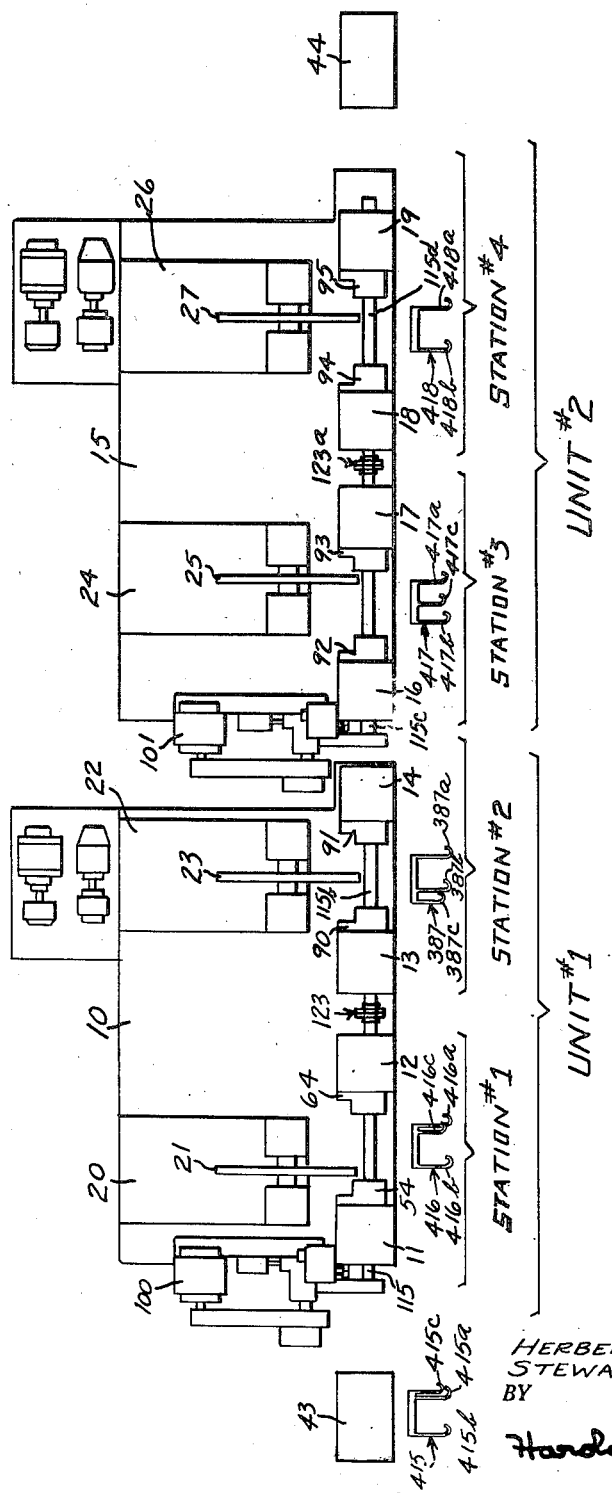

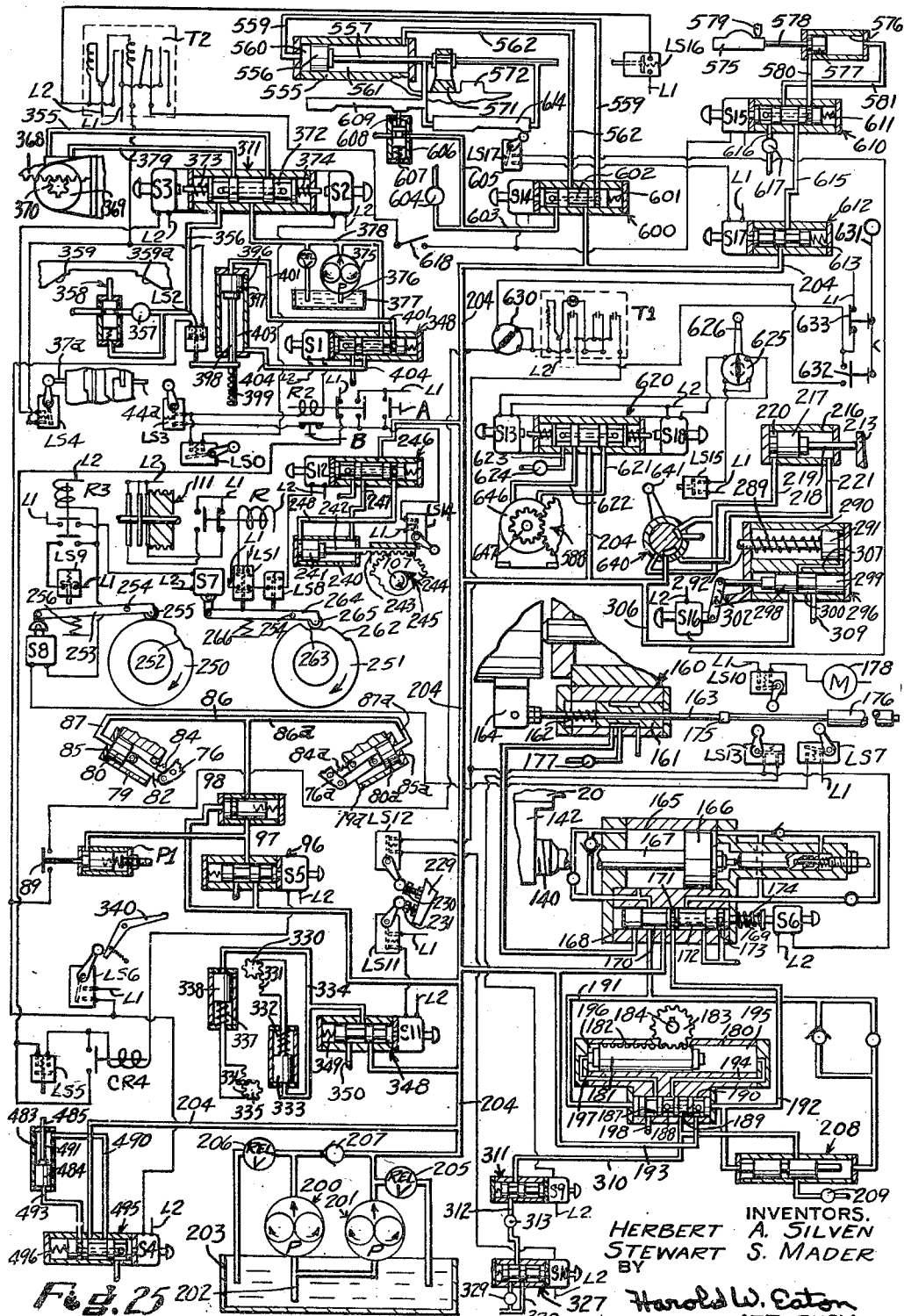

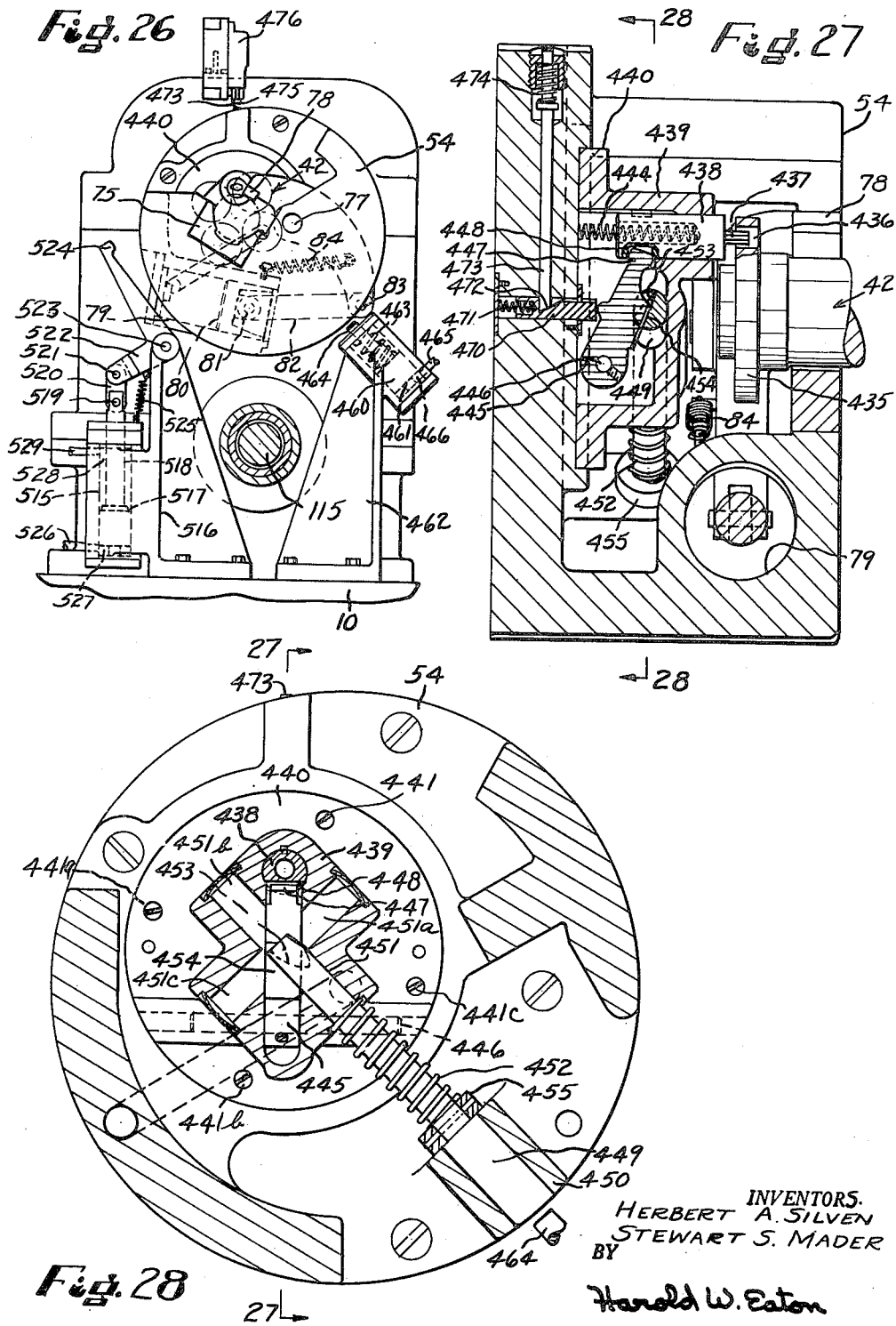

United States Patent Office 2,780,895
Patented Feb. 12, 1957

2,780,895

CRANKPIN GRINDING MACHINE

Herbert A. Silven and Stewart S. Mader, Worcester, Mass., assignors to Norton Company, Worcester, Mass., a corporation of Massachusetts Application June 4, 1954, Serial No. 434,484

19 Claims. (Cl. 51—105)

The invention relates to grinding machines, and more particularly to a crankpin grinding machine.

One object of the invention is to provide a crankpin grinding machine automatically to grind all of the crankpins on a crankshaft. Another object is to provide a crankpin grinding machine having a plurality of grinding stations, one station for grinding each crankpin on a crankshaft. Another object is to provide an automatic work transfer mechanism having a plurality of spaced loader units to pick up crankshafts from a loading rack and from each grinding station and to traverse toward the right so that the first loader unit with a rough crankshaft stops at the first grinding station and the next three loader units stop at the second, third and fourth grinding stations, while the last or righthand loader unit stops at the unloading rack.

Another object is to provide each of the work loader units with a plurality of spaced hooks, two of which engage and support spaced main bearings of a crankshaft during automatic transfer from a loader rack to the first grinding station, station to station, and the last station to an unloading rack, and a third hook which engages one of the crankpins rotatably to index the crankshaft for the next grinding station.

A further object is to provide an interlock to prevent forward movement of the grinding wheel and to prevent work rotation unless a crankshaft is clamped in operative position in the pot chucks. Another object is to provide an interlock to prevent forward movement of the grinding wheel unless a crankshaft to be ground is rotatably indexed into proper position. Another object is to provide an interlock to prevent unclamping the pot chucks unless the chucks are stopped in a predetermined loading position. Another object is to provide an interlock to prevent movement of the work transfer mechanism unless all of the pot chucks are stopped in loading positions and the work clamping jaws are opened. Another object is to provide an interlock to prevent a side truing operation of the grinding wheels unless the wheel feed cylinder is disengaged from the feed screw and the work rotation interlocked in a stopped position.

Another object is to provide a multiple station crankpin grinding machine in which each station is provided with an independent feed control apron, each having a push button control panel for controlling the station. Another object is to provide a master start button at each control station whereby the automatic cycle of the machine may be initiated from any one of the control stations. Another object is to provide a master stop button switch at each of the control stations whereby all of the grinding wheels may be simultaneously retracted and the work piece at each station stopped in a predetermined loading position. Another object is to provide an independent selector switch on each control panel whereby each independent station may be independently operated or all stations operated simultaneously and automatically. Other objects will be in part obvious or in part pointed out hereinafter.

In the accompanying drawings, in which is shown one of the various possible embodiments of the mechanical features of the invention, Figs. 1 and 2 arranged end to end constitute a front elevation of the crankpin grinding machine;

Fig. 7 is a fragmentary front elevation, on an enlarged scale, of one of the feed control aprons, partly broken away and shown in section;

Fig. 8 is a fragmentary sectional view, on an enlarged scale, taken approximately on the line 8—8 of Fig. 7, through one of the wheel feed clutch mechanism;

Fig. 9 is a fragmentary left hand end elevation, on an enlarged scale, of the work driving mechanism on one of the work heads;

Fig. 10 is a right hand end elevation, on an enlarged scale, of one of the steady rest, and the crankshaft axial positioning mechanism;

Fig. 11 is a front elevation of the steady rest shown in Fig. 10.

Fig. 12 is an end elevation partly in section, of one of the work supporting pot chucks;

Fig. 13 is a view of a crankshaft to be ground, showing the work loader hooks positioned to pick up a crankshaft from the loading station;

Fig. 14 is a similar view, showing the loader hooks positioned for transferring a crankshaft from station No. 1 to station No. 2;

Fig. 15 is a similar view showing the loader hooks positioned for transferring a crankshaft from station No. 2 to station No. 3;

Fig. 16 is a similar view showing the loader hooks positioned for transferring a crankshaft from station No. 3 to station No. 4;

Fig. 17 is a front elevation, on an enlarged scale, of one of the work loader units;

Fig. 18 is a right hand end elevation of the work loader unit shown in Fig. 17;

Fig. 19 is a fragmentary end view of one set of loader hooks positioned as in Fig. 15 showing the approximate path of the movement of the loader hooks;

Fig. 20 is a front elevation, on an enlarged scale, of one of the wheel guard truing mechanisms;

Fig. 21 is a vertical sectional view, taken approximately on the line 21—21 of Fig. 20, showing the truing tool feeding mechanism;

Fig. 22 is a horizontal sectional view, taken approximately on the line 22—22 of Fig. 21;

Fig. 23 is a block diagram showing the arrangement of the grinding stations and units, and also the automatic work transfer mechanism;

Fig. 24 is a diagrammatic plan view of the machine, showing the arrangement of the grinding stations and units;

Fig. 25 is a combined electrical and hydraulic diagram of the actuating mechanism of the machine;

Fig. 26 is an end elevation of the pot chuck, on an enlarged scale, showing a modified angular crankshaft indexing mechanism;

Fig. 27 is a vertical sectional view, on an enlarged scale, taken approximately on the line 27—27 of Fig. 28, through the angular indexing mechanism;

Fig. 28 is a vertical sectional view, taken approximately on the line 28—28 of Fig. 27;

Fig. 29 is a diagrammatic view, on an enlarged scale, showing the opposed cams for axially positioning the crankshaft to center a crankpin relative to the grinding wheel;

Fig. 30 is a vertical sectional view, on a reduced scale, taken approximately on the line 30—30 of Fig. 9, showing the electric brake-clutch in the work driving mechanism;

Fig. 31 is a fragmentary detail view partly in section on an enlarged scale showing the adjustable cams on the stop pawl of the wheel feeding mechanism;

Figure 1:
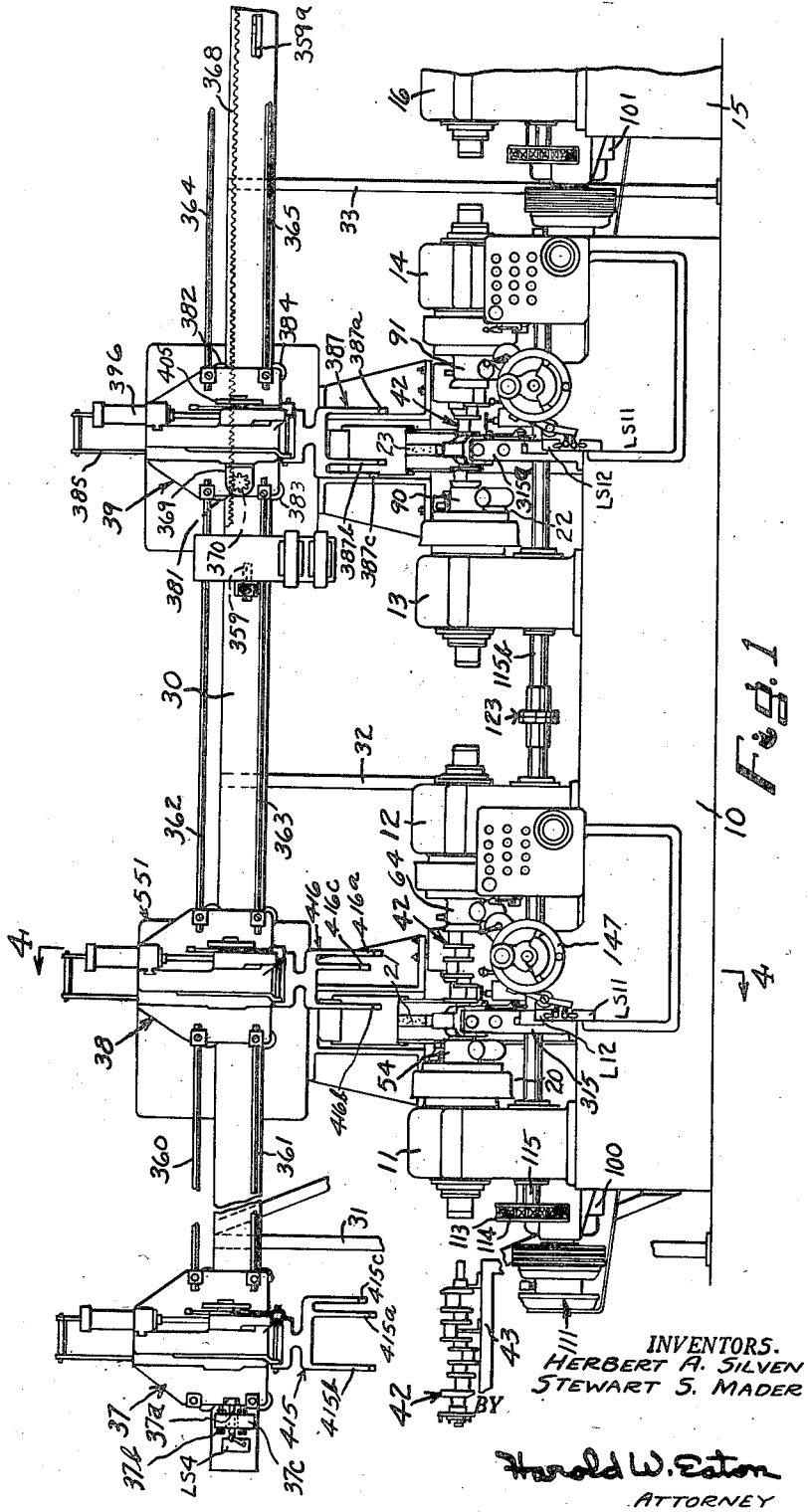

A crankpin grinding machine has been illustrated in the drawings which is adapted for grinding all of the crankpins on a crankshaft of a V-8 engine or for a four cylinder straight line engine, each of which has four crankpins to be ground. If it is desired to grind other crankshafts having a greater number of pins to be ground, additional units having additional pairs of grinding stations, and also additional work loading units may be provided.

The grinding machine is provided with a plurality of spaced grinding stations, one for each crankpin to be ground. As illustrated, the machine comprises two aligned units, each having a pair of spaced aligned grinding stations. A work transfer mechanism is provided comprising a plurality of spaced loading units automatically and simultaneously to pick up the crankshafts to be ground from a loading rack and from each grinding station and to traverse toward the right so that the first loading unit with the rough crankshaft stops at the first grinding station and the next three loading units stop at the second, third and fourth grinding stations, while the last or right hand loading unit stops over an unloading rack. The loading units then deposit the first four crankshafts into the four grinding station work holders, and the last loading unit deposits the finished ground crankshaft onto the unloading rack. All of the loading units are then traversed toward the left and stop in their initial positions ready for the next cycle. The work loading units in addition to transferring the crankshafts from station to station, also serve rotatably to index the crankshaft for successive grinding operations.

Figure 2:
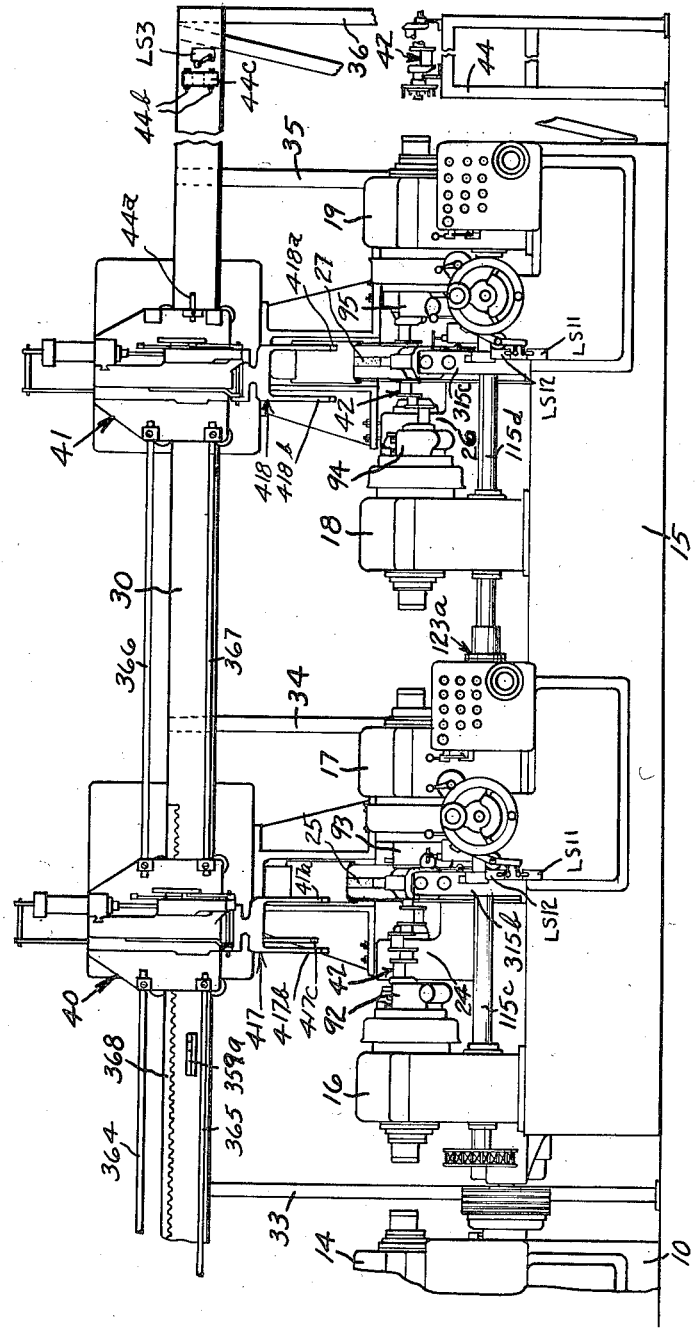

As illustrated in Figs. 1 and 2, the machine comprises a base 10 (unit 1) which supports a pair of spaced aligned work heads 11 and 12 (station 1) and a pair of aligned spaced work heads 13 and 14 (station 2). The machine also includes a base 15 (unit 2) having a pair of spaced aligned work heads 16 and 17 (station 3) and a pair of work heads 18 and 19 (station 4) mounted thereon.

A transversely movable wheel slide 20 having a rotatable grinding wheel 21 is mounted on the base 10 and is arranged to move transversely toward and from the work heads 11 and 12 to grind No. 4 crankpin on the crankshaft to be ground. Similarly a transversely movable wheel slide 22 having a rotatable grinding wheel 23 thereon is arranged to move transversely toward and from the work heads 13 and 14 and is positioned so that the grinding wheel 23 will grind crankpin No. 3 on the crankshaft to be ground. A wheel slide 24 having a rotatable grinding wheel 25 is arranged to be moved transversely on the machine base 15 toward and from the work heads 16 and 17 to facilitate grinding crank pin No. 1 on the crankshaft being ground. Similarly a transversely movable wheel slide 26 having a rotatable grinding wheel 27 is mounted on the machine base 15 and is arranged to move transversely toward and from the work heads 18 and 19 to facilitate grinding crankpin No. 2 on the crankshaft to be ground. A work transfer mechanism is provided automatically to transfer work pieces between successive grinding stations. As illustrated in Figs. 1 and 2 this mechanism may comprise a channel iron or rail 30 which is supported at the upper end of vertical supports 31, 32, 33, 34, 35 and 36 respectively. The rail 30 serves as a support for a plurality of spaced work loading units 37, 38, 39, 40 and 41 which are arranged to pick up a crankshaft 42 to be ground from a loading rack 43 and successively transfer the shaft through grinding stations No. 1, No. 2, No. 3 and No. 4, and then deposit the finished ground shaft on an unloading rack 44 at the other end of the machine.

Work heads

The pairs of work heads 11—12, 13—14, 16—17, and 18—19 are identical in construction, consequently only one pair will be described in detail. The work heads 11 and 12 (Fig. 3) are provided with axially aligned rotatable work spindles 50 and 51 respectively. The spindle 50 is rotatably journalled in spaced anti-friction bearings 52 and 53 carried by the work head 11. A pot chuck 54 is mounted on the right hand head of the spindle 50. A driving sprocket 55 is keyed on the spindle 50 and is connected by a link chain 56 with a sprocket 57 which is keyed on a rotatable sleeve 58. The sleeve 58 is journalled in spaced bearings 59 and 60 carried by the work head 11.

The spindle 51 is journalled in spaced anti-friction bearings 62 and 63 carried by the work head 12. A pot chuck 64 is mounted on the left hand end of the spindle 51. A driving sprocket 65 is keyed on the spindle 51 and is connected by a link chain 66 with a sprocket 67 which is keyed on a rotatable sleeve 68. The sleeve 68 is journalled in spaced bearings 69 and 70 carried by the work head 12.

Pot chucks

The pot chucks 54 and 64 are identical in construction, consequently only one the pot chuck 54 has been illustrated in detail in Fig. 12. The pot chuck 54 is provided with a fixed half bearing 75 for supporting one end of the crankshaft 42 to be ground. A work clamping jaw 76 is pivotally supported on a stud 77 carried by the chuck 54. The jaw 76 is provided with a work engaging shoe 78 which is arranged to engage the end portion of the crankshaft 42 and to clamp it rigidly in engagement with the half bearing 75. A fluid pressure actuating mechanism is provided on the chuck 54 for actuating the clamping jaw 76. This mechanism may comprise a cylinder 79 fixedly mounted on the chuck 54 which contains a slidably mounted piston 80. The piston 80 is connected by a stud 81 with one end of a link 82. The other end of the link 82 is connected by a stud 83 with the clamping jaw 76. When fluid under pressure is passed through a pipe 86 and through a central passage 87 in the spindle 50 (Fig. 3) into a cylinder chamber 85, the piston 80 will be moved toward the right (Fig. 12) so as to swing the clamping jaw 76 in a counter-clockwise direction so that the shoe 78 will engage and clamp the crankshaft 42 in the bearing 75 on the pot chuck 54. A tension spring 84 is connected between the stud 83 and a stud 83a on the outside of the cylinder 79. When fluid under pressure is cut off from the cylinder chamber 85, the released tension of the spring 82 swings the clamping jaw 76 in a clockwise direction to unclamp the crankshaft 42. Similarly fluid under pressure is passed through a pipe 86a (Fig. 25), through a central aperture 87a into a cylinder chamber 85a to actuate the piston 80a within the cylinder 79a to actuate the pot chuck 64.

A control valve 96 is provided to control the admission of fluid under pressure to the pot chuck cylinders 80 and 80a respectively. The valve 96 is normally held in the right hand end position by means of a spring and is arranged to be shifted in a left hand end position by the energization of a solenoid S5. When the solenoid S5 is energized fluid under pressure in the pressure pipe 204 may pass through the valve 96, through a pipe 97 to a pressure actuated valve 98. Fluid under pressure direct from the pressure pipe 204 serves normally to shift the valve 98 toward the right (Fig. 25) so that fluid under pressure passing through the pipe 97 may pass through the valve 98 into the pipes 86 and 86a to actuate the pot chucks 54 and 64 respectively. A pressure switch P1 is provided in the pipe line 97 having a normally opened contactor 89. When fluid under pressure passes through the pipe 97, the normally opened contactor 89 is closed. The energization of the solenoid S5 is controlled by a relay switch CR4 which is connected in series with a limit switch LS5 so that the pot chucks cannot be actuated to clamp a crankshaft until after the work piece has been axially positioned relative to the grinding wheel.

The work heads 13 and 14 are provided with pot chucks 90 and 91, respectively. The work heads 16 and 17 are provided with pot chucks 92 and 93, respectively. The work heads 18 and 19 are provided with pot chucks 94 and 95, respectively. These pot chucks are identical with pot chucks 54 and 64.

Work drive

As shown diagrammatically in Fig. 24, each of the units No. 1 and No. 2 are provided with independent work driving mechanisms which are substantially identical, consequently only the mechanism for unit No. 1 has been illustrated in detail in Fig. 9. An electric motor 100 mounted on the base 10 is provided for driving the work heads 11—12 and 13—14. An electric motor 101 mounted on the base 15 is provided for driving the work heads 16—17 and 18—19.

Figure 3:
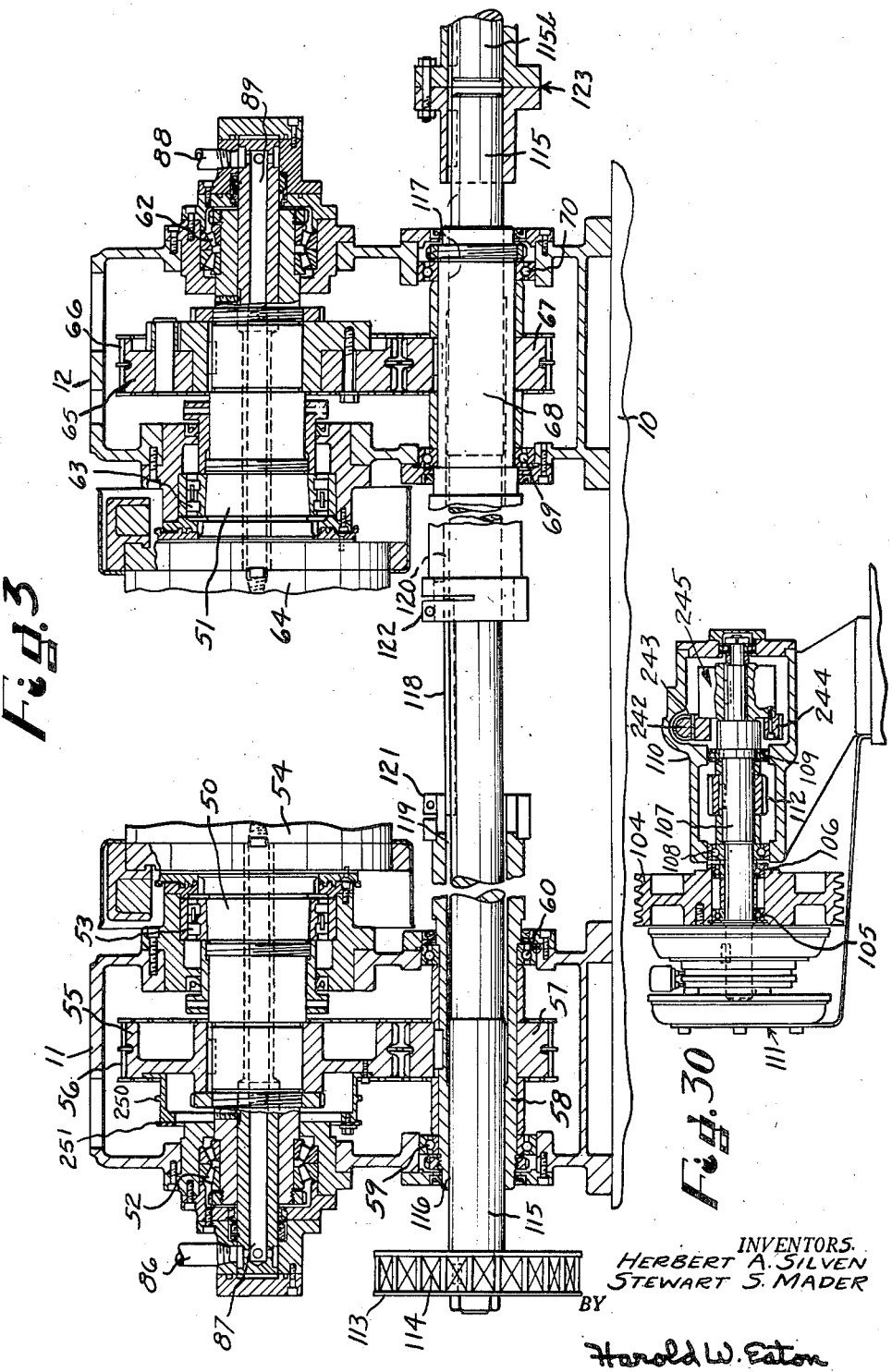
Fig. 3 is a vertical sectional view, on an enlarged scale, through one pair of work heads.

The motor 100 is provided with a multiple V-groove pulley 102 which is connected by multiple V-belts 103 with a multiple V-groove pulley 104. The pulley 104 is supported by a pair of spaced anti-friction bearings 105 and 106 carried by a rotatable shaft 107 (Fig. 30). The shaft 107 is rotatably journalled in a pair of spaced anti-friction bearings 108 and 109 which are supported in a casing 110. An electric brake-clutch unit 111 is provided for drivingly connecting the pulley 104 to the shaft 107. The electric brake-clutch unit 111 may be of any of the standard well-known commercial units, such as, for example that manufactured by Warner Electric Brake and Clutch Company of Beloit, Wisconsin. A sprocket 112 is keyed on the shaft 107 and is connected by a link chain 113 with a sprocket 114 mounted on the left hand end of a rotatable drive shaft 115 (Fig. 3).

It is desirable to equalize the driving torque between the shaft 115 and the sleeves 58—68 so as to provide a synchronous drive for the work spindles. The shaft 115 is rotatably journalled in bearing surfaces 116 and 117 formed within the sleeves 58 and 68 respectively (Fig. 3). The central portion of the shaft 115 is provided with a driving key 118 which mates with keyways 119 and 120 formed within the adjacent ends of the sleeves 58 and 68 respectively. The adjacent ends of the sleeves 58 and 68 are slotted and surrounded by clamping collars 121 and 122 respectively by means of which the sleeves 58 and 68 may be clamped to the drive shaft 115. It will be readily apparent from the foregoing disclosure that the motor 100 serves to drive the shaft 115 and through its central portion to drive the sleeves 58 and 68 synchronously to rotate the work spindles 50 and 51. The key construction above described also serves to facilitate setting up the machine. The work heads 11 and 12 may be adjusted longitudinally on the base 10 into the desired position after which they may be bolted or fixedly secured to the base 10.

The drive shaft 115 is connected by a coupling 123 (Figs. 3 and 24) synchronously to rotate a drive shaft 115b for imparting a rotary motion to the work heads 13 and 14 respectively. This drive shaft is identical with that just described and consequently has not been illustrated in detail.

Similarly the driving motor 101 is connected through an identical driving mechanism to rotate a drive shaft 115c to impart a rotary motion to the work heads 16 and 17. The shaft 115c is connected by a coupling 123a with a drive shaft 115d which drives the work heads 18 and 19. The drive connections between the shaft 115c and the work heads 16—17, and the drive between the drive shaft 115d and the work heads 18—19 is identical with that previously described in connection with the work heads 11 and 12. It will be readily apparent from the foregoing disclosure that the motor 100 serves to drive the work heads of unit 1, namely, stations No. 1 and station No. 2. Similarly the motor 101 serves to drive the work heads of unit No. 2, namely, stations No. 3 and No. 4.

Wheel slide

Figures 5, 6:
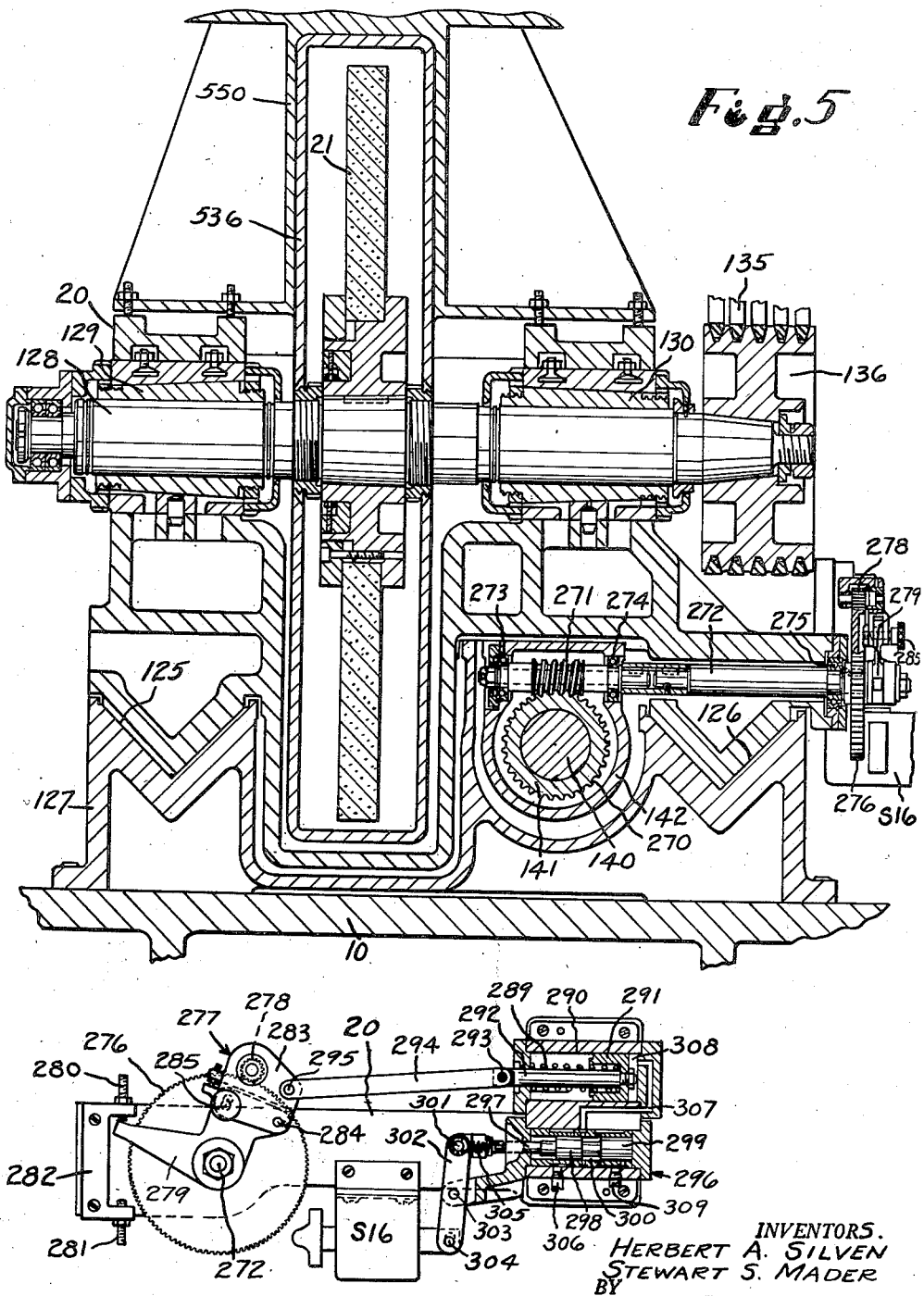
Fig. 5 is a staggered vertical sectional view, on an enlarged scale, taken approximately on the line 5—5 of Fig. 4.
Fig. 6 is a fragmentary right hand end elevation, partly in section, of the feed compensating mechanism.

The grinding wheel slide 20 is arranged to slide transversely on the base 10 on a pair of spaced parallel V-ways 125 and 126 (Fig. 5). The V-ways 125 and 126 are formed on the upper surface of a wheel base 127 which is in turn fixedly mounted on the base 10.

The wheel slide 20 is provided with a rotatable wheel spindle 128 (Fig. 5) which is journalled in a pair of spaced bearings 129 and 130. An electric motor 131 (Fig. 4) is mounted on a motor base 132 which is adjustably mounted on the upper surface of the wheel slide 20 and is arranged to be adjusted relative thereto by means of an adjusting screw 133 to facilitate tensioning the driving belts as desired. The motor 131 is provided with a multiple V-groove pulley 134 which is connected by multiple V-belts 135 with a multiple V-groove pulley 136 on the wheel spindle 128. It will be readily apparent from the foregoing disclosure that the rotation of the motor pulley 134 will be imparted to drive the wheel spindle 128 and the grinding wheel 21.

Each of the wheel slides 22, 24 and 26 are identical in construction with the wheel slide 20, consequently they have not been illustrated in detail.

Wheel feed

Figure 4:
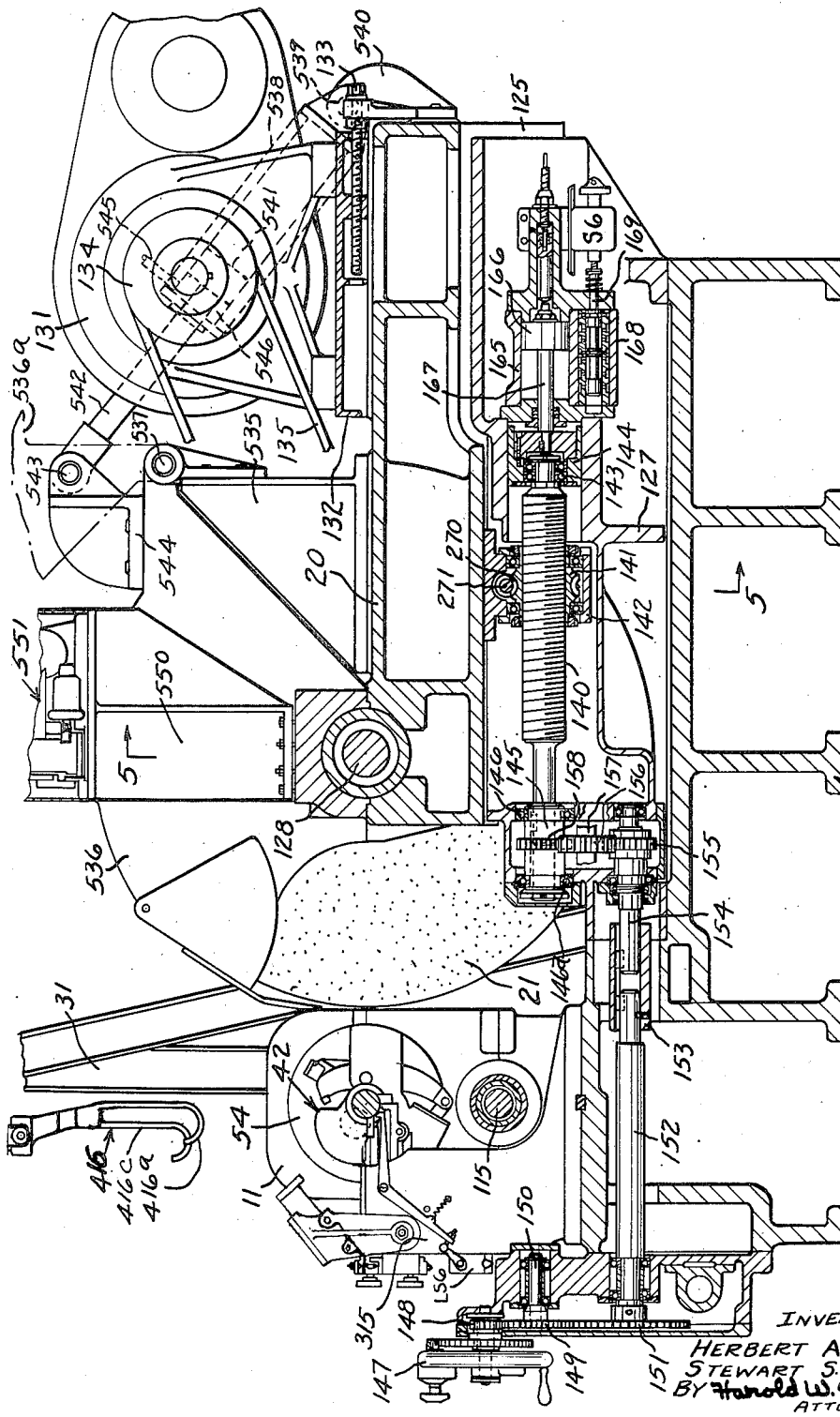
Fig. 4 is a transverse vertical sectional view, on an enlarged scale, taken approximately on the line 4—4 of Fig. 1, through one of the wheel slides showing the wheel feeding mechanism.

A suitable wheel feeding mechanism is provided for imparting a transverse feeding movement to the wheel slide 20. This mechanism may comprise a rotatable wheel feed screw 140 which meshes with or engages a rotatable nut 141 (Figs. 4 and 5). The nut 141 is rotatably supported within a bracket 142 depending from the underside of the wheel slide 20. The right hand end of the feed screw 140 is journalled in an anti-friction bearing 143 carried by a longitudinally slidable sleeve 144. The left hand end of the feed screw 140 is slidably keyed within a rotatable sleeve 145 which is rotatably journalled in anti-friction bearings 146 and 146a.

A rotatable manually operable feed wheel 147 is mounted on the front of the machine base. The feed wheel 147 is arranged to rotate a gear 148 which meshes with a gear 149 supported on a rotatable shaft 150. The gear 149 meshes with a gear 151 mounted on the left hand end of a rotatable shaft 152 (Fig. 4). The right hand end of the shaft 152 is slidably keyed within a sleeve 153. A shaft 154 is also keyed within the other end of the sleeve 153 and is provided with a gear 155 which meshes with a gear 156 carried by a shaft 157. The gear 156 meshes with a gear 158 which is fixedly mounted on the sleeve 145. It will be readily apparent from the foregoing disclosure that rotation of the feed wheel 147 will be imparted through the gear mechanism just described to rotate the feed screw 140 and thereby cause a transverse movement of the wheel slide 20 relative to the base 10. The direction of rotation of the feed wheel 147 serves to determine the direction of movement of the wheel slide 20.

It is desirable to provide a mechanism for imparting a rapid approaching and receding movement to the wheel slide 20 to facilitate rapidly moving the grinding wheel to an operative position before a grinding operation and rapidly withdrawing the grinding wheel therefrom after grinding operation has been completed. This mechanism is preferably a hydraulic mechanism comprising a cylinder 165 which contains a slidably mounted piston 166. The piston 166 is connected to one end of a piston rod 167, the other end of which is fastened to the slidably mounted sleeve 144. A control valve 168 is provided for controlling the admission to and exhaust of fluid from the cylinder 165. The control valve 168 is preferably a piston type valve comprising a valve stem 169 having a plurality of spaced valve pistons formed integrally therewith so as to form a plurality of valve chambers 170, 171, 172 and 173. A compression spring 174 surrounding the valve stem 169 serves normally to hold the valve stem in a right hand end position such as is shown in Figs. 4 and 25. A solenoid S6 is provided which when energized serves to shift the valve stem 169 toward the left to reverse the flow of fluid under the cylinder 165. The solenoid S6 is energized automatically in a manner to be hereinafter described to initiate an infeeding cycle on the grinding machine.

The grinding wheel feed controlling mechanism is substantially identical to that shown in the prior U. S. Patent No. 2,572,529 to H. A. Silven, dated October 23, 1951, to which reference may be had for details of disclosure not contained herein. The feeding mechanism includes a shoulder grinding feed control valve 160. The valve 160 is a piston type valve comprising a hollow sleeve type valve member 161. The valve member 161 is normally held in a right hand end position by means of a spring 162. A rod 163 is fastened to a bracket 164 which is in turn fixedly mounted on the sleeve 144. The rod 163 passes through a central aperture in the valve member 161 and is provided with a pair of adjustably mounted sleeve-type dogs 175 and 176. When the wheel slide 20 is moved rapidly to position the grinding wheel relative to the work piece to be ground, the rapid approaching movement continues until the dog or nut 175 engages the valve member 161 after which fluid exhausting from the said control valve 168 passes through a needle valve 177 which is adjusted to produce the desired and predetermined shoulder feed.

A normally open limit switch LS10 is closed by the dog or sleeve 176 during the rapid approaching movement of the grinding wheel slide 20 to start a coolant pump motor 178. During the rearward movement of the wheel slide 20, the limit switch LS10 is again opened automatically to stop the motor 178 and thereby stop the flow of coolant fluid to the grinding wheel. The sleeve or dog 176 during its rapid movement toward the left (Fig. 25) is arranged to close a normally open limit switch LS7 and to open a normally closed limit switch LS13 which functions in a manner to be hereinafter described.

A hydraulically operated mechanism is provided for obtaining a slow grinding feed. This mechanism may comprise a cylinder 180 (Figs. 7, 8 and 25). The cylinder 180 contains a slidably mounted piston 181 having rack teeth 182 formed in its upper surface. A gear 183 is rotatably supported in anti-friction bearings and meshes with the rack 182. The gear 183 has a central aperture which supports a rotatable shaft 184 having a gear 185 fixedly mounted thereon. The gear 185 meshes with the gear 151 so that an endwise movement of the piston 181 will be transmitted to rotate the feed screw 140 to impart a slow feeding movement to the grinding wheel 21 and the wheel slide 20.

A fluid pressure actuated control valve 186 is provided for controlling the admission to and exhaust of fluid from the cylinder 180. The control valve 186 is a piston type valve having slidably mounted valve member formed with a plurality of spaced valve pistons forming spaced valve chambers 187, 188, 189, and 190. When fluid under pressure is passed through a pipe 191 (Fig. 25) into a left hand end chamber in the valve 186, the slidable valve member is moved toward the right. During this movement fluid may exhaust from the end chamber formed at the right hand end of the valve 186 and through a pipe 192. Fluid under pressure passing from a suitable source to be hereinafter described passes through a pipe 193 into the valve chamber 190, through a central passage in the slidable valve member into the valve chamber 188, through a passage 194 into a cylinder chamber 195 to move the piston 181 toward the left into the position illustrated in Figs. 7 and 25. During this movement of the piston 181, fluid within a cylinder chamber 196 exhausts through a passage 197 (Fig. 25), through the valve chamber 187 and out through an exhaust pipe 198.

*Fluid system*

An independent fluid pressure system is provided for supplying fluid under pressure to units No. 1 and No. 2. As illustrated in the drawings the system for unit No. 1 comprises a Hi-Low pump comprising a low pressure high volume pump 200 and a high pressure low volume pump 201 which are arranged to draw fluid through a pipe 202 (Figs. 23 and 25) from a reservoir 203 and to force fluid under pressure through a pipe 204. A relief valve 205 is provided for returning excess fluid under pressure directly to the reservoir 203 from the pump 201. Similarly a relief valve 206 is provided for allowing excess fluid under pressure from the pump 200 to pass directly to the reservoir 203. A ball check valve 207 is provided between the pump 200 and the pressure line 204. In the normal operation of the machine, the pump 201 supplies fluid under high pressure and low volume to the various operating mechanisms of unit No. 1 of the machine. If there is insufficient volume of fluid in the system for actuating the various mechanisms, the ball check valve 207 opens and the pressure supply in the pipe line 204 is supplemented by fluid under low pressure of high volume from the pump 200.

Similarly unit No. 2 (Fig. 23) is provided with a Hi-Low pump comprising a low pressure high volume pump 200a and a high pressure low volume pump 201a which are arranged to draw fluid through a pipe 202a from a reservoir 203a and force fluid under pressure through a pipe 204a (Fig. 23). A relief valve 205a is provided for returning excess fluid under pressure directly to the reservoir 203a from the pump 201a. A relief valve 206a is provided for allowing excess fluid under pressure from the pump 200a to pass directly to the reservoir 203a. A ball check valve 207a is provided between the pump 200a and the pressure line 204a. In the normal operation of the machine, the pump 201a supplies fluid under high pressure and low volume to the various operating mechanisms of the unit No. 2 of the machine. If there is insufficient volume of fluid in the system for actuating the various mechanisms, the ball check valve 207a opens and the supply of fluid in the pipe line 204a is supplemented by fluid under low pressure and high volume from the pump 200a (Fig. 23).

*Feed clutch*

A suitable clutch mechanism is provided to facilitate rendering the cylinder 180 and piston 181 inoperative. This mechanism may comprise an external gear 210 which is fixedly mounted relative to the gear 183. An internal gear 211 is slidably keyed on the shaft 184 so that it may be thrown into or out of mesh with the external gear 210. The hub of the internal gear 211 is provided with an annular grove 212 (Fig. 8). A pivotally mounted lever 213 is supported by a stud 214. Diametrically opposed studs 215 carried by the lever 213 ride in the groove 212.

A fluid pressure mechanism is provided for actuating the clutch lever 213 comprising a cylinder 216 having a slidably mounted piston 217. The piston 217 is connected to one end of a piston rod 218, the other end of which is arranged to engage the upper end of the clutch lever 213. When fluid under pressure is passed through a pipe 219 into a cylinder chamber 220, the piston 217 will be moved toward the right (Fig. 8) so as to rock the lever 213 in a clockwise direction thereby shifting the internal gear 211 toward the right out of mesh with the external gear 210 thereby declutching the gear 183 from the shaft 184. During movement of the piston 217 toward the right fluid may exhaust from the other end of the cylinder through a pipe 221. Compression springs 223 are interposed between the hub of the internal gear 214 and a collar 224 fastened onto the right hand end of the shaft 184. When fluid under pressure is relieved from the pipe 219, the released compression of the springs 223 will move the internal gear 211 into mesh with the external gear 210 and at the same time rock the lever 213 in a counterclockwise direction to return the piston 217 into the position illustrated in Fig. 8. A manually operable control valve 640 actuated by a control lever 641 is provided for controlling the admission to and exhaust of fluid from the cylinder 216 so as to actuate the feed clutch.

Wheel feed stop

It is desirable to provide a positive stop for limiting the infeeding movement of the wheel slides and the grinding wheels. This is preferably accomplished by means of a pivotally mounted stop pawl 225 which is supported on a pivot stud 226. The upper end of the pawl 225 is provided with a stop surface 227 which is engaged by an adjustable stop abutment 228 carried by the feed wheel 147. The stop pawl 225 is provided with a downwardly extending arm 229 having an adjustably mounted stop screw 230 which is arranged to engage the actuating roller of a normally open limit switch LS12. The arm 229 is also provided with a second adjustable stop screw 231 which is arranged to engage the actuating roller of a normally open limit switch LS11. A compression spring 232 is connected between a stud 234 fixed on the feed mechanism apron and a stud 233 mounted on the arm 229. The spring 232 tends to rock the arm 229 together with the pawl 225 in a clockwise direction so that the pawl 225 engages a stop pin 235. In this position of the arm 229, the stop screws 230 and 231 maintain the limit switches LS12 and LS11 closed (Fig. 7).

The upper end of the pawl 225 (Fig. 31) is provided with an adjustable cam 236 which is arranged to be engaged by a cam surface 237 carried by the feed wheel 147. Similarly the pawl 225 is provided with an adjustable cam 238 which is arranged to be engaged by a cam 239 on the stop abutment 228 to rock the pawl 225. By adjustment of the stop screws 230 and 231 and the cams 236 and 238, the cam 237 will cause a slight counterclockwise movement of the pawl 225 and the arm 229 so that the stop screw 231 recedes from the roller of the limit switch LS11 so as to allow the limit switch LS11 to open thereby effecting a movement of the steady rest shoes in operative engagement with the crankpin being ground in a manner to be hereinafter described. The detent 238 is adjusted so that the cam 239 engages the detent 238 slightly after the limit switch LS11 has opened to impart a slight further rocking movement to the pawl 225 and the arm 229 in a counterclockwise direction so that the stop screw 230 recedes from the actuating roller of the limit switch LS12 to allow the limit switch LS12 to open thereby rendering the sizing feed operative in a manner to be hereinafter described.

Work stop control

A work stop control mechanism is provided for each of the units No. 1 and No. 2 to facilitate stopping the pot chucks 54—64, 90—91, 99—93 and 94—95 in predetermined upright positions. These mechanisms are identical in construction, consequently only the mechanism for unit No. 1 will be described in detail. A pair of cams 250 and 251 are mounted to rotate with the work spindle 50. The cam 250 (Fig. 3) is fixedly mounted on the left hand side face of the sprocket 55 and is provided with a depression 252 (Fig. 9). A rock arm 253 is pivotally supported on a rock shaft 254 and is provided with a follower roller 255 which rides on the periphery of the cam 250. A compression spring 256 is provided normally to maintain the roller 255 (Fig. 25) in operative engagement with the cam 250. A solenoid S8 is provided for rocking the rock arm 253 in a counterclockwise direction to facilitate rocking the roller 255 out of depression 252 when desired. When the roller 255 rides into the depression 252, the spring 256 causes the rock arm 253 to rock in a clockwise direction to open a normally closed limit switch LS9.

The cam 251 is adjustably mounted on the side face of the cam 250. The cam 251 is provided with an elongated arcuate slot 260 and a pair of clamping screws 261 which pass through the slot 260 and are screw threaded into the cam 250. The cam 251 is provided with a pair of depressions 262 and 263. A rock arm 264 is pivotally mounted on the rock shaft 254 and is provided with a follower roller 265 which is arranged to ride upon the periphery of the cam 251. The rock arm 264 is normally urged in a clockwise direction by means of a compression spring 266 to maintain the roller 265 normally in engagement with the operative surface of the cam 251. A push type solenoid S7 is provided which when energized serves to rock arm 264 in a counterclockwise direction to raise the roller 265 out of depression 263. The rocking movement of the arm 264 serves to actuate a pair of limit switches LS1 and LS8.

A hydraulically operated rack and gear mechanism is provided for racking the work spindle precisely to predetermined positions after the work drive has been declutched. This mechanism may comprise a cylinder 240 (Figs. 9 and 25) containing a slidably mounted piston 241. The piston 241 is fixedly mounted on the left hand end of a piston rod 242. The piston rod 242 is provided with an integral rack bar 243 which meshes with a gear 244. The gear 244 is supported on the shaft 107 (Figs. 9 and 30) and is connected therewith by a free wheeling clutch 245 so that the gear 244 is free to rotate in a counterclockwise direction (Fig. 25) on the shaft 107. When the gear 244 is rotated in a clockwise direction, an over-running clutch 245 locks the gear 244 to the shaft 107 so as to impart a rotary motion to the shaft 107, through the chain drive mechanism above described to impart a precise rotary positioning movement to the work spindles and pot chucks.

A piston type control valve 246 is provided for controlling the admission to and exhaust of fluid from the cylinder 240. The valve 246 is normally maintained in the position illustrated in Fig. 25 by means of a compression spring so that fluid under pressure from the pressure pipe 204, passes through the valve 246, through the pipe 247 to move the piston 241 toward the left. During stopping of the work rotation, a solenoid S12 is energized to shift the valve 246 toward the right so that fluid under pressure is passed through the pipe 248 into the cylinder chamber formed at the left hand end of the cylinder 240 to move the piston 241 toward the right thereby imparting a clockwise rotary motion to the shaft 107.

During the rearward movement of the wheel slide 12, the normally closed contactors of the limit switch LS13 close ready for the next cycle. The normally open contactors of the limit switch LS10 open to stop the coolant motor. The normally open contacts of the limit switch LS7 open to deenergize the solenoid S8 to break a circuit, but limit switch LS9 maintains relay R3 energized until the roller 255 drops into depression 252 in the cam 250. The limit switch LS9 then opens to deenergize the relay R3. The normally open contacts of the relay R3 open to deenergize the solenoid S7. When the roller 265 drops into the first depression 262 of the cam 251, the normally open contacts of the limit switch LS1 close to energize the relay R. The normally closed contacts of the relay R open to declutch the work drive and normally open contacts of the relay R close to actuate the brake. At the same time the normally closed contacts of the limit switch LS8 are still closed to energize the solenoid S12 to rack the work spindles through a partial rotation by actuation of the piston 241 and the cylinder 240 until the roller 265 drops into the second depression 263 in the cam 251 which opens the normally closed contacts of the limit switch LS8 to deenergize the solenoid S12 and return the rack piston 241 toward the left (Fig. 25) (free wheeling clutch 245 allows work spindle to remain stationary). Just before the limit switch LS8 opens, due to roller 265 dropping into the second depression 263 of the cam 251, normally open contacts of the limit switch LS14 are closed momentarily by the rack bar 243, this sets up a holding circuit through the normally closed contacts of the limit switch LS3 and the relay R2 to start the work loaders on the next cycle of operation.

Wheel feed compensator

A wheel feed compensating mechanism is provided to facilitate advancing the wheel slide 20 together with the grinding wheel 21 before and during a truing operation without disturbing the normal grinding feed mechanism. As illustrated in Figs. 5 and 6 the rotatable feed nut 141 is provided with a worm gear 270 on its outer periphery. The worm gear 270 meshes with a worm 271 on a shaft 272. The shaft 272 for convenience of assembly is made in two parts as indicated in Fig. 5. The shaft 272 is supported in spaced anti-friction bearings 273, 274, and 275. A gear 276 is mounted on the right hand end of the shaft 272. A bell crank lever 277 is rotatably supported by the shaft 272. The bell crank lever 277 is provided with a rotatably mounted pinion 278 which is connected to its supporting stud through a ball clutch (not shown). An arm 279 of the bell crank lever 277 is arranged when oscillated to engage a pair of spaced adjustable stop screws 280 and 281 which are arranged to determine the oscillating stroke of the bell crank 277. The screws 280 and 281 are supported by a bracket 282 which is fixedly mounted on the side of the wheel slide 20. The upper portion of the bell crank lever 277 is formed as a pivotally mounted frame 283 which is pivoted on a stud 284 and arranged to be clamped in position on the bell crank lever 277 by means of a clamping screw 285. The pinion 278 is carried by the pivotally mounted frame 283 to facilitate throwing the pinion 278 out of mesh with the gear 276 when desired. The clamping screw 285 may be loosened and the frame 283 rocked in a clockwise direction thereby throwing the pinion 278 out of engagement with the gear 276.

A fluid pressure operated mechanism is provided for actuating the bell crank lever 277. This mechanism may comprise a cylinder 290 which contains a slidably mounted piston 291. The piston 291 is connected to the right hand end of a piston rod 292 (Fig. 6). The other end of the piston rod 292 is connected by a stud 293 with one end of a link 294. The other end of the link 294 is connected by a stud 295 with the frame 283 on the bell crank lever 277. When the piston 291 is moved toward the left (Fig. 6), the bell crank lever 277 will be rocked in a counterclockwise direction and due to the ball clutch, the pinion 278 cannot rotate and consequently will impart a rotary motion to the gear 276 which in turn through the worm gear mechanism above described will impart a rotary motion to the feed nut 141 thereby advancing the grinding wheel slide 20. The extent of the compensating motion may be determined by the setting of the stop screws 280 and 281.

A control valve 296 is provided for controlling the admission to and exhaust of fluid from the cylinder 290. The control valve 296 is preferably a piston type control valve comprising a valve stem 297 having a pair of spaced valve pistons 298 and 299 formed integrally therewith and forming a valve chamber 300 therebetween. The valve stem 297 is connected by a stud 301 with the upper end of a rock arm 302. The rock arm 302 is pivotally mounted on a stud 303 which is fixedly mounted relative to the wheel slide 20. The lower end of the rock arm 302 is connected by a stud 304 with the armature of a solenoid S16. A tension spring 305 is provided between the stud 301 and the casing of the valve 296 normally to hold the valve stem 297 in a right hand end position as illustrated in Fig. 6.

When the solenoid S16 is energized, the rock arm 302 is rocked in a counter-clockwise direction to move the valve stem 297 toward the left so that fluid under pressure passing through a pipe 306 enters the valve chamber 300 and passes through a passage 307 into a cylinder chamber 308 to move the piston 291 toward the left thereby imparting a rotary motion in a counter-clockwise direction to the gear 276 so as to advance the wheel slide 20 to compensate as desired.

When the solenoid S16 is deenergized, the released tension of the spring 305 returns the control valve 296 into the position illustrated in Fig. 6 so that fluid within the cylinder chamber 308 may exhaust through the passage 307, through the valve chamber 300 and out through an exhaust pipe 309. The released compression of the spring 289 serves to move the piston 291 toward the right thereby moving the bell crank lever 277 in a clockwise direction to return it to its initial position as illustrated in Fig. 6. During the return motion of the bell crank lever 277, the ball clutch allows the pinion 278 to roll in mesh with the gear 276 thereby transmitting no motion to the gear 276. Each time the solenoid S16 is energized a compensating adjustment will be made, that is a rotary motion will be imparted to the feed nut 144. This compensating adjustment does not effect the normal grinding feeding cycle of the wheel slide 20. An identical compensating mechanism is provided for the feeding mechanism of each of the wheel slides 22, 24 and 26.

Steady rest

In a crankpin grinding operation, it is desirable to provide a suitable steady rest for steadying the crankpin being ground. As illustrated in the Figs. 1 and 2 a steady rest 315 is provided on station No. 1 to steady and support crankpin No. 4 during a grinding operation. Similarly a steady rest 315a is provided on station No. 2 for steadying crankpin No. 3 during a grinding operation thereon. A steady rest 315b (Fig. 2) is provided on station No. 3 for supporting and steadying crankpin No. 1 during a grinding operation thereon. A steady rest 315c is provided on station No. 4 for supporting crankpin No. 2 during a grinding operation thereon. The steady rest 315, 315a, 315b and 315c are all identical in construction consequently only one of these steady rests has been illustrated and will be described in detail. These steady rests are positioned and fixedly mounted on the bases 10 and 15.

The steady rest 315 (Figs. 10 and 11) is fixedly mounted on the base 10 and is provided with a horizontally adjustable work steady shoe 316. A nut and screw mechanism 317 actuated by a knob 318 is provided for adjusting the steady rest shoe 316 toward and from the periphery of the crankpin No. 4 to be ground. A second steady rest shoe 319 is supported on an arm 320 and is arranged to engage the crankpin at a point below the axis and adjacent to the line of contact between the grinding wheel and the crankpin. The arm 320 is pivotally supported by a stud 321 on the steady rest 315. A slidably mounted cam 322 is slidably supported on the steady rest 315. A nut and screw adjusting mechanism 323 is provided which is actuated by a knob 324 to facilitate a transverse adjustment of the cam 322. The cam 322 engages a roller 325 supported by a stud 326 on the arm 320. It will be readily apparent from the foregoing disclosure that by manipulation of the knob 324, the work steadying shoe 319 may be adjusted as desired toward and from the surface of the work piece being ground. The adjustments for the work steadying shoes above described is substantially identical to that shown in the prior U. S. Patent No. 2,419,170 to H. S. Silven dated April 15, 1947 to which reference may be had for details of disclosure not contained herein. A gear 330 is mounted to rotate the screw 317. The gear 330 meshes with a rack bar 331 which is moved in one direction by means of a compression spring 332 and in the other direction by a piston 333. The spring 332 being arranged to rotate the screw 317 in a direction to advance the steadying shoe 316 toward the work axis while the piston 333 serves to retract the steady rest shoe when fluid under pressure is passed through a pipe 334.

Similarly a gear 335 is mounted on the screw 323 and meshes with a rack bar 336. The rack bar is arranged to be moved in an upward direction (Fig. 25) by means of a compression spring 337 to rotate the gear 335 and the screw 323 so as to advance the work steadying shoe 319 toward the work axis. A piston 338 is provided for rotating the gear 335 at the screw 323 in the reverse direction to retract the steady rest shoe 319 when fluid under pressure is passed through the pipe 334. This mechanism for controlling the advancing and retracting movements of the steady rest shoes is identical with that shown in the prior patent above referred to, consequently this mechanism has not been illustrated in detail in the present case.

A control valve 348 (Fig. 24) is provided for controlling the passage of fluid under pressure through the pipe 334 to the steady rest 315. A spring 349 is provided normally to hold the valve 348 in a right hand end position as illustrated in Fig. 25. A solenoid S11 is provided which when energized serves to shift the valve 348 into a left hand end position. The normally open limit switch LS11 which is held closed by the feed stop pawl arm 229 closes a circuit to energize the solenoid S11 so that fluid under pressure from the pipe 204 passes through the valve 348 and through the pipe 334 to apply pressure to the steady rest pistons 333 and 338 respectively normally to maintain the steady rest shoes 316 and 319 in inoperative positions. During grinding operation when the crankpin being ground has been rounded-up, the feed pawl arm 229 swings in a counter-clockwise direction thereby allowing the limit switch LS11 to open to deenergize the solenoid S11 so that fluid under pressure in the pipe 204 is cut off. In the position of valve 348, the released compression of the springs 332 and 337 serves to exhaust fluid from behind the pistons 333 and 338 respectively through the pipe 334, through the valve 348 and out through an exhaust pipe 350. During this movement the work steadying shoes 316 and 319 move into operative engagement with the crankpin being ground and are maintained in engagement therewith by the released compression of the springs 332 and 337.

The steady rest 315 is provided with a feeler arm 340 which is pivotally supported by a stud 341 on the steady rest 315. The feeler arm 340 is formed as a bell crank levr having a downwardly projcting arm 342. A stop pin 343 is provided for limiting the rocking movement of the feeler arm 340 in a counter-clockwise direction. A tension spring 344 is connected between arm 343 and a stud 345 fixedly mounted on the steady rest 315. The tension of the spring 344 serves normally to tend to rock the feeler arm 340 in a counter-clockwise direction. The lower end of the arm 342 is provided with an adjustably positioned screw 346 which is arranged to engage the actuating roller of a normally open limit switch LS6. When a crankshaft is inserted into the machine, the pin to be ground engages the feeler arm 340 and rocks the arm in a clockwise direction thereby rocking the arm 342 in a clockwise direction so as to close the normally open limit switch LS6. The limit switch LS6 is interconnected so as to prevent starting a grinding cycle unless a crankshaft is properly positioned in the pot chucks ready for a grinding operation in a manner to be hereinafter described.

The steady rest 315a, 315b and 315c are identical in construction to that shown in Figs. 10 and 11 and consequently have not been illustrated in detail. These steady rests are positioned to support respective crankpins on the crankshaft being ground and are fixedly supported by the bases 10 and 15 respectively. The steady rest 315 is fixedly mounted on the base 10 so as to support the crankpin No. 4 during a grinding operation thereon. The steady rest 315a is also supported on the base 10 and positioned to support crankpin No. 3 during a grinding operation thereon. The steady rest 315b is mounted on the base 15 and is positioned for supporting the crankpin No. 1 during grinding thereon. The steady rest 315c is supported on the base 15 and is positioned to support crankpin No. 2 during a grinding operation thereon.

*Work loader units*

The work loader units 37, 38, 39, 40 and 41 are all slidably mounted on the slide rail 30. These loader units are preferably tied together so that all of the units move simultaneously during a work transferring operation. The work loader unit 37 is connected by a pair of parallel rods 360 and 361 with the work loader unit 38. The work loader unit 38 is connected by rods 362 and 363 (Fig. 1) with the work loader unit 39. The work loader unit 39 is connected by rods 364 and 365 (Figs. 1 and 2) with the work loader unit 40. The work loader unit 40 is connected by rods 366 and 367 with the work loader unit 41.

A suitable driving mechanism is provided for simultaneously traversing all of the work loader units longitudinally relative to the rail 30. The rail 30 is provided with a rack bar 368. The work loader unit 39 is provided with a rotary-type fluid motor 369 having a gear 370 on its driven shaft which meshes with the rack bar 368. It will be readily apparent that actuation of the fluid motor 369 will be imparted through the gear 370 and the rack bar 368 simultaneously to traverse all of the work loader units 37, 38, 39, 40 and 41 longitudinally on the rail 30.

A solenoid actuated control valve 371 (Fig. 25) is provided for controlling the admission to and exhaust of fluid from the fluid motor 369. The control valve 371 is a piston type valve having a slidable valve member 372 which is normally held in a central or neutral position by means of a pair of balanced compression springs 373 and 374. A pair of solenoids S2 and S3 are provided for shifting the valve member 372 in either direction to pass fluid under pressure to the fluid motor 369. Fluid under pressure is supplied by a fluid pump 375 which draws fluid through a pipe 376 from a reservoir 377 and passes fluid under pressure through a pipe 378 to the control valve 371. When the solenoid S2 is energized, the slidably mounted valve member 372 will be shifted toward the left so that fluid under pressure is passed through a pipe 379 to the motor 369 to rotate the gear 370 in a counterclockwise direction to traverse all of the work loader units toward the right (Figs. 1 and 2). During this movement fluid exhausts from the other side of the motor 369 through a pipe 355, through the control valve 371 and out through an exhaust pipe 356. In order to control the rate of movement of the work loader units, a throttle valve 357 is provided in the exhaust pipe 356. By manipulation of the throttle valve 357, the rate of transferring work pieces between grinding stations may be varied as desired. It is desirable to slow down the shifting movement of the work loaders as they approach the end of their stroke in either direction. This is preferably accomplished by a normally open valve 358 which is gradually closed by a cam 359 or a cam 359a as the loaders approach the end of their stroke in either direction.

Similarly when the solenoid S3 is energized the slidably mounted valve member 372 is shifted toward the right (Fig. 25) so that fluid under pressure passing through the pipe 378 passes through the pipe 355 to the fluid motor 369 to rotate the gear 370 in a clockwise direction thereby traversing the work loader units toward the left. The operation of the work loader traversing mechanism is tied in with the other operating mechanisms of the machine in a manner to be hereinafter described.

All of the work loader units 37, 38, 39, 40 and 41 are identical in construction consequently only one of these units has been illustrated and will be described in detail. The work loader unit 39 comprises a frame 380 which carries two pairs of spaced rollers 381, 382, 383 and 384 which ride upon the upper and lower surfaces of the rail 30 so as to provide a roller support for the unit 39. The frame 380 supports a vertically movable slide 385. The slide 385 (Figs. 17 and 18) is provided at its lower end with a rock shaft 386 which in turn pivotally supports a work hook member 387. The vertical slide 385 is provided with a forwardly projecting portion 388 which extends through a rectangularly shaped aperture 389 formed in the frame 380. The frame 380 is provided with a pair of spaced forwardly extending bosses 390 and 391 which support a pivot stud 392. The stud 392 is connected to the upper end of a connecting rod 393. The projecting portion 388 of the vertical slide 385 rotatably supports a crankshaft 394 having crankpin 395 which is operatively connected to the lower end of the connecting rod 393.

A hydraulically operated mechanism is provided for moving the slide 385 vertically comprising a cylinder 396 which is fixedly supported on the projection 388 of the slide 385. The cylinder 396 contains a slidably mounted piston 397 which is connected to the upper end of a piston rod 398. The downwardly extending portion of the piston rod 398 is provided with rack teeth 399 which mesh with a gear 400 keyed onto the crankshaft 394. When fluid under pressure from the pump 375 is passed through a pipe 401 into a cylinder chamber 402 formed at the upper end of the cylinder 396, the piston 397 will be moved downwardly during which movement the rack 399 will impart a rotary motion to the gear 400 thereby revolving the crankpin 395. Due to the fact that the upper end of the connecting rod 393 is pivotally anchored by the stud 392 to the frame 380, the slide 385 will be caused to move in a downward direction. One complete downward stroke of the piston 397 serves to impart one revolution to the crankpin 395 to cause a down and up movement to the vertical slide 385. During the downward movement of the piston 397, fluid within a cylinder chamber 403 may exhaust through a pipe 404. A control valve 348 is provided for controlling the admission to and exhaust of fluid from the work loader cylinders 396. The valve 348 (Fig. 25) is normally held in a left hand end position by a compression spring. A solenoid S1 is provided which when energized serves to shift the valve 348 into a right hand end position.

The work hook member 387 is moved through the path as illustrated by arrows in Fig. 19. During a picking up operation, that is, when all of the work loader hooks of the loader units 37, 38, 39, 40 and 41 are moved downwardly to pick up crankshafts, the hook members are moved through the path indicated in Fig. 19 in a clockwise direction. In depositing the crankshafts after a transfer to the next station, the hook member of each loader unit are moved through the path indicated in Fig. 19 but in a counterclockwise direction.

In order to obtain required transverse movement of the loader hook member 387, a cam actuating mechanism is provided comprising a cam plate 405 which is fixedly keyed onto the right hand end of the crankshaft 394 (Fig. 17). The plate 405 is provided with a track cam 406. A follower 407 is mounted on the upper end of an arm 408 which is fixedly mounted relative to the hook member 387. It will be readily apparent from the foregoing disclosure that during the down and up movement of the slide 385, rotation of the crankshaft 394 will be imparted through the cam 406 to impart a transverse rocking movement to the hook member 387. The shape of the cam track 406 is designed so that the work hook member 387 will follow the path as indicated in Fig. 19.

The projection 388 of the vertical slide 385 is provided with a dog bar 410 which supports a pair of adjustable dogs 411 and 412 for actuating a pair of limit switches LS0 and LS2 respectively.

In transferring the crankshaft 42 from the loading station to successive grinding stations, it is necessary to rotatably index the crankshaft so that the crankpin to be ground is in an approximate indexed position that is concentric with the axis of the rotation of the work spindles. This is preferably accomplished by means of the work hook members. The work hook member 387 (Figs. 17 and 18) is provided with a pair of spaced aligned hooks 387a and 387b which are arranged to engage spaced main bearings on the crankshaft 42 (Fig. 15). A third loader hook 387c is arranged to engage crankpin No. 4 when the loader hooks 387 move upwardly. The hook 387c engages the crankpin No. 4 before the hooks 387a and 387b engage the main bearings and further upward movement of the hook member 387 causes the hook 387c to impart a rotary motion to the crankshaft 42 approximately to position the crankpin No. 1 for the next grinding operation.

The work loader unit 37 is provided with a loader hook member 415 having a pair of spaced loader hooks 415a and 415b for engaging main bearings on the crankshaft 42 on the loading station 43. Before the hooks 415a and 415b engage the main bearings, a third loader hook 415c engages crankpin No. 1. Due to the upward movement of the hook 415, the hook 415c imparts a rotary indexing movement to the crankshaft 42 to position crankpin No. 4 for a grinding operation at station No. 1.

The work loader unit 38 is provided with a work hook member 416 having hooks 416a and 416b which are arranged to engage main bearings on the crankshaft 42 when picking the shaft up from grinding station No. 1. Before the hooks 416a and 416b move upwardly into engagement with the main bearings of the crankshaft 42, a third hook 416c engages crankpin No. 2 to impart a rotary indexing movement to the crankshaft 42 so as to position crankpin No. 3 into position for a grinding operation at station No. 2. The work loader No. 39 is provided with a hook member 387 having a pair of spaced hooks 387a and 387b for engaging main bearings of the crankshaft 42 after a grinding operation at grinding station No. 2. During this pick up motion hook 387c engages crankpin No. 4 rotatably to index the crankshaft 42 so as to position crankpin No. 1 in approximate position for grinding when transferred to grinding station No. 3.

The work loader unit 40 is provided with a hook member 417 having a pair of spaced hooks 417a and 417b for engaging main bearings of a crankshaft after a grinding operation at the station No. 3. Hook 417c engages crankpin No. 3 before the hooks 417a and 417b engage the main bearings thereof and imparts a rotary indexing movement to the shaft 42 to position crankpin No. 2 for a grinding operation at grinding station No. 4.

The work loader 41 is provided with a hook member 418 having a pair of hooks 418a and 418b which are arranged to engage main bearings of a crankshaft after a grinding operation at grinding station No. 4 to pick up the crankshaft 42 and transfer it to the unloading rack 44 to the right of station No. 4. It will be readily apparent from the foregoing disclosure that the picking up of the crankshafts at the loading station, grinding station No. 1, grinding station No. 2, grinding station No. 3 and grinding station No. 4 operates simultaneously. The pick-up operation of crankshafts 42 by loader units 37, 38, 39 and 40 at the loading station and grinding stations Nos. 1, 2 and 3 serve to impart an approximate rotary indexing movement to the crankshafts 42 for positioning the crankpin to be ground in the next grinding station. The precise rotary indexing of the shaft at grinding stations Nos. 1, 2, 3 and 4 is accomplished after crankshaft has been positioned in the respective pot chucks in a manner to be hereinafter described.

The longitudinal movement of the work loaders 37—38—39—40—41 is positively limited by means of adjustably mounted stop screws 37b carried by a bracket 37c which is fixedly mounted on the rail 30 (Fig. 1). The movement of the work loader unit assembly toward the right is positively limited by adjustable stop screws 44b which are carried by a bracket 47c fixedly mounted on the rail 30 (Fig. 2). A limit switch LS4 mounted on the left hand end of the rail 30 (Fig. 1) is engaged by a stud 37a carried by the work loader unit 37 (Fig. 1) to open the switch LS4 thereby deenergizing the solenoid S3 when the work loader unit assembly reaches a left hand end position. Similarly a limit switch LS3 mounted adjacent to the right hand end of the rail 30 (Fig. 2) is actuated by a stud 44a when the work loader unit assembly reaches the right hand end of its stroke to break a circuit so as to deenergize the solenoid S2.

*Rotary work indexing*

The work loader mechanism above described serves approximately to rotatably index the pin to be ground before the crankshaft 42 is dropped into position in the supporting pot chucks. It is desirable to provide a precise rotary indexing mechanism precisely to rotatably index the crankshaft after it has been placed in position on the pot chucks to position the crankpin to be ground so that its axis coincides with the axis of rotation of the pot chucks. As illustrated in Figs. 1, 2, 13, 14, 15 and 16 an adapter plate 420 is provided which is mounted on the left hand end of the crankshaft 42 to be ground. The adapter plate 420 is provided with a locating stud 421 which is positioned to mate with a semi-circular notch 422 formed in the periphery of flange 423 which is formed integral with the crankshaft 42. The adapter plate 420 is held in position on the crankshaft 42 by means of a clamping screw 424. The adapter plate 420 is provided with a plurality of spaced symmetrically arranged locating pins 425, 426, 427 and 428 which are arranged successively to position the crankpins on the crankshaft 42 to be ground.

As illustrated in Fig. 12 the clamping jaw 78 of the pot chuck 92 is provided with a spring pressed plunger 429. When the clamping jaw 78 is swung in a counter-clockwise direction to clamp a crankshaft 42 into pot chuck 92, the spring pressed plunger 429 swings into engagement with the locating pin 425 and imparts a rotary indexing movement to the crankshaft 42 which continues until the locating pin 425 engages an adjustable stop screw 430 fixedly mounted on the pot chuck 92. The locating pin 425 serves precisely to position the crankpin No. 1 in a predetermined indexed position into axial alignment with the axes of the pot chucks 92 and 93. The locating pins 426, 427 and 428 serve on successive positioning movement at work stations 2, 3 and 4 (Figs. 13, 14, 15 and 16) to position crankpins Nos. 3, 1 and 2 successively into axial alignment with their supporting pot chucks. The pot chucks 90, 92 and 94 at grinding stations Nos. 1, 2 and 4, respectively, are each provided with a rotary indexing mechanism identical with that shown in Fig. 12 and described above for rotatably indexing crankpins No. 4, No. 3 and No. 2, respectively into precise indexed positions for grinding.

A modified form of indexing mechanism is shown in Figs. 26, 27 and 28 for rotatably indexing a crank shaft 42 without the use of an adapter plate. The crankshaft 42 (Fig. 27) is provided with an integral flange 435 adjacent to its left hand end. The flange 435 is provided with a locating hole 436 which is provided to facilitate positioning the shaft in the desired indexed positions. A slidably mounted index stud 437 is arranged so that it may be moved into and out of engagement with the locating hole 436. The index stud 437 is formed on the right hand end of a slidably mounted plunger 438 which is slidably keyed within a housing 439 formed integral with a flange 440. The flange 440 is held in position on the pot chuck 54 by means of a plurality of screws 441, 441a, 441b and 441c. A compression spring 444 serves normally to urge the plunger 438 and the index stud 437 into engagement with the locating hole 436 on the crankshaft 42.

A suitable mechanism is provided for withdrawing the index stud 437. This mechanism may comprise a rock arm 445 which is fixedly mounted on a rock shaft 446. The upper end of the rock arm 445 is provided with an enlarged head 447 having opposed circular faces which are arranged to engage a notch 448 formed in the plunger 438.

An actuating slide rod 449 is slidably mounted within a boss 450 (Fig. 28) formed integral with the pot chuck 54. The upper end of the slide rod 449 slides within a cylindrical aperture 451 formed in the housing 439. A compression spring 452 surrounds the slide rod 449 and is interposed between the housing 439 and a collar 455 which is pinned onto the slide rod 449. The spring 452 serves normally to urge the slide rod 449 in a downward direction into the position illustrated in Fig. 28. The upper end of the slide rod 449 is provided with a cam face 453 which is arranged to engage a surface 454 formed on the rock arm 445. It will be readily apparent that when the slide rod 449 is moved upwardly, the cam face 453 engaging the surface 454 will cause the rock arm 445 to rock in a counter-clockwise direction (Fig. 27) to shift the plunger 438 toward the left thereby withdrawing the index stud 437 from the locating hole 436. The slide rod 449 is preferably actuated by and in timed relation with other mechanisms of the machine so as to withdraw the index stud 437 after a crankpin has been ground and before the crankshaft 42 is removed from the pot chucks 54 and 64. A hydraulically operated mechanism is provided for actuating the slide rod 449 when the pot chuck 54 is in a loading position. This mechanism may comprise a fluid pressure operated cylinder 460 containing a slidably mounted piston 461. The cylinder 460 is formed integral with a supporting bracket 462 which is fixedly mounted on the base 10. A compression spring 463 surrounds a piston rod 464 which is fixedly mounted relative to the piston 461 and is interposed between the piston 461 and the upper head of the cylinder 460. When fluid under pressure is passed through a pipe 465 (Fig. 26) into a cylinder chamber 466 formed at the lower end of the cylinder 460, the piston 461 together with the piston rod 464 will be moved upwardly against the compression of the spring 463 so as to cause an upward movement of the slide rod 449 against the compression of the spring 452 thereby withdrawing the plunger 438 toward the left (Fig. 27) to withdraw the index stud 437 from the locating hole 436. In this position of the parts, the clamping jaw 78 may be released and the ground crankshaft 42 removed from engagement with the pot chucks 54 and 64 respectively.

An electrical interlocking mechanism is provided to prevent clamping the pot chucks, starting the work rotating or starting an infeeding movement of the grinding wheel until the index stud 437 is in engagement with the locating hole 436. This mechanism may comprise a slidably mounted plunger 470 within the pot chuck 54 (Fig. 27). The plunger 470 is normally urged toward the right by means of a compression spring 471 so that its right hand end engages a portion of the rock arm 445. The plunger 470 is provided with a cam face 472 which engages a follower surface formed on the lower end of a slide rod 473. The slide rod 473 is normally urged in a downward direction by means of a compression spring 474 (Fig. 27) to maintain the lower end thereof in operative engagement with the cam 472. When the pot chuck 54 is in a loading position the axis of the slide rod 473 is aligned with the actuating plunger 475 of a limit switch 476. The limit switch 476 is preferably a normally open limit switch which is closed by upward movement of the slide rod 473. It will be readily apparent from the foregoing disclosure that when the rock arm 445 moves in a counter-clockwise direction to withdraw the index stud 437 from the locating hole 436, the rock arm 445 will move the plunger 470 toward the left (Fig. 27). Movement of the plunger 470 toward the left shifts the cam 472 also toward the left to cause an upward movement of the slide rod 473 so that its upper end engages and moves the actuating plunger 475 upwardly to close the normally open limit switch 476. The left hand pot chucks 54, 90, 92 and 94 at each of the grinding stations Nos. 1, 2, 3 and 4 are provided with a rotary indexing mechanism, such as shown in Figs. 12 and 15 or as shown in Figs. 26, 27 and 28.

The housing 439 is provided with a plurality of holes 451, 451a, 451b and 451c for the slide rod 449 so that at the other grinding stations, namely, stations No. 1, 2 and 4, the flange 435 may be positioned in any one of four positions relative to the pot chucks 90, 92 and 94 to position the index stud 437 in proper position for positioning the crankpin to be ground at a given station. On grinding stations Nos. 1, 2 and 4, the slide rod 449 will be aligned with the holes 451a, 451b or 451c, respectively. In any of these positions of housing 439, the rock arm 445 is positioned so that an upward direction movement of the slide rod 449 and the cam face 453 will rock the rock arm 445 in a counterclockwise direction to withdraw the index stud 447.

The above described mechanism serves to precisely locate the crankshaft 42 to be ground. The work loader mechanism previously described serves to rotatably index the crankpin to be ground into an approximate indexed position. After the crankshaft 42 has been positioned in the pot chucks, and before it is clamped in position thereon, it is necessary to impart a precise rotary indexing motion to the crankshaft 42 until the index stud 437 moves into engagement with the locating hole 436 on the flange 435 of the crankshaft 42. In the preferred form a hydraulically operated mechanism is provided comprising a cylinder 515 which is formed integral with a bracket 516 (Fig. 26) fixedly mounted on the base 10. The cylinder 515 contains a slidably mounted piston 517 fixedly supported on the lower end of a piston rod 518. The upper end of the piston rod 518 is connected by a stud 519 with a link 520. The link 520 is connected by a stud 521 with one arm of a bell crank lever 222. The bell crank lever 522 is pivotally supported by a stud 523 carried by an upwardly extending portion of the bracket 516. The upwardly extending arm of the bell crank lever 522 is provided with an enlarged head 524 which is arranged to swing into engagement with one of the crankpins of the crankshaft 42 to impart a counter-clockwise indexing movement to the crankshaft 52 (Fig. 26) until the released compression of the spring 444 moves the index stud 437 into engagement with the locating hole 436 (Fig. 27).

One of these units is provided at each of the grinding stations Nos. 1, 2, 3 and 4. The bracket 516 in each case being positioned longitudinally on the bases 10 and 15 so that the head 524 of the bell crank lever 522 will engage one of the crankpins on the crankshaft to impart a rotary indexing movement thereto. A spring 525 serves normally to hold the bell crank lever 522 in an inoperative position as shown in Fig. 26.

When fluid under pressure is passed through a pipe 526 into a cylinder chamber 527, the piston 517 will be moved upwardly to impart a clockwise motion to the bell crank lever 522 so that the head 524 moves into engagement with crankpin No. 3 on the crankshaft 42 to cause a counter-clockwise rotary indexing movement of the crankshaft 42. This rotary indexing movement continues until the index stud 437 engages the locating hole 436. During this movement, fluid within a cylinder chamber 528 may exhaust through a pipe 529. All of these units, that is, at grinding stations Nos. 1, 2, 3 and 4 are operated simultaneously by simultaneously passing fluid under pressure through the pipe 526 to impart a rotary indexing motion to each of the crankshafts 42 at all of the grinding stations.

*Spark splitter*

In the grinding of a crankpin on a crankshaft 42, it is desirable to position the crankshaft 42 in an axial direction so that the opposed shoulders or cheeks 4a and 4b of the crankpin 4 will be centered relative to the side faces of the grinding wheel so as to equalize the side grinding of the wheel as the grinding wheel is fed into the crankpin 4 to be ground. In the preferred form, it is desirable to position the crankshaft 42 in an axial direction as it is moved by the work loaders, above described, into operative supporting engagement with the pot chucks. A suitable mechanism is provided which is preferably mounted on the steady rest base 315 for positioning the crankshaft 42 axially. This mechanism may comprise a yoke shaped arm 480 which straddles the upper portion of the steady rest base 315 and is pivotally supported thereon by a pair of aligned studs 481 and 482. The arm 480 is arranged so that it may be moved to and from an operative position by means of a hydraulically operated mechanism comprising a cylinder 483 which is fixedly mounted on the side of the steady rest base 315. The cylinder 483 contains a slidably mounted piston 484 connected to the lower end of a piston rod 485. The upper end of the piston rod 485 is connected by a stud 486 with a link 487. The upper end of the link 487 is connected by a stud 488 with an arm 489 which is fixedly mounted on the yoke shaped arm 480. When fluid under pressure is passed through a pipe 490 into a cylinder chamber 491, the piston 484 is moved downwardly so as to rock the arm 480 in a clockwise direction (Fig. 10) from an inoperative position 480a shown in broken lines in Fig. 10 into the full line position 480. During this movement fluid within a cylinder chamber 492 may exhaust through a pipe 493.

A suitable control valve 495 (Fig. 25) is provided for controlling the admission to and exhaust of fluid from the cylinder 483. This valve is preferably a piston type valve having a valve stem formed with a plurality of integral valve pistons which form a plurality of valve chambers. The valve stem is normally held in a right hand end position by a compression spring 496. A solenoid S4 is provided which when energized serves to shift the valve into a left hand end position. In the position of the valve 495 (Fig. 25) fluid under pressure from the pressure pipe 204 passes through the valve 495, through the pipe 490 into the cylinder chamber 491 to move the piston 484 downwardly thereby swinging the yoke shaped arm 480 into an operative position. When the solenoid S4 is energized, fluid from the pressure pipe 204 passes through the valve 495 and through the pipe 493 into the cylinder chamber 492 to cause an upward movement of the piston 484 which serves to rock the yoke shaped arm 480 in a counter-clockwise direction into the broken line position 480a (Fig. 10).

In order to center the crankpin 4 on the crankshaft 42 relative to the grinding wheel, a member 500 is pivotally supported by a stud 501 supported by the yoke shaped arm 480. The member 500 fits within a rectangularly shaped aperture 502 formed within the yoke shaped arm 480. A compression spring 503 is interposed between a stud 504 on the arm 480 and an adjusting screw 505 carried by the member 500, normally to urge the member in a counter-clockwise direction. By manipulation of the screw 505, the compression of the spring 503 may be varied as desired so that the member 500 is free to yield when engaged by the work piece in a manner to be hereinafter described.

The forward end of the member 500 is provided with a crankpin positioning member 506 having cam faces 507 and 508 formed on opposite edges thereof. The cam faces 507 and 508 are preferably formed with symmetrical curved portions adjacent to the upper end thereof after which the faces gradually taper so that the lowered portions thereof are spaced apart by distance slightly greater than the maximum allowable distance between the cheeks 4a and 4b of the crankpin 4. The positioning member 500 is arranged so that when the crankshaft 42 is lowered in a substantially vertical direction by the work loaders above described, the cheeks 4a and 4b will engage either the cam face 507 or the cam face 508 as the shaft is dropped into an operative position in the pot chucks to cause an axial movement of the crankshaft 42 to center the shoulders 4a and 4b relative to the side face of the grinding wheel before the crankshaft is finally positioned in supporting engagement with the pot chucks.

Grinding wheel-truing apparatus

A grinding wheel truing apparatus is provided for each of the grinding stations, Nos. 1, 2, 3 and 4. The truing apparatus is mounted on top of the grinding wheel guard and is preferably arranged so that the grinding wheels may all be simultaneously trued after a predetermined number of crankshafts have been ground. Each of the grinding wheels is provided with a wheel guard 535 (Fig. 4) which partially surrounds the grinding wheel 21. The wheel guard 535 is provided with an upper hinged portion 536 which is pivotally supported by a stud 537. The guard portion 536 is arranged so that it may be swung in a clockwise direction to facilitate replacement of the grinding wheels 21 when desired. A hydraulically operated mechanism is provided for moving the guard cover 536 to and from an operative position. This mechanism may comprise a cylinder 538 which is pivotally supported by a stud 539 carried by a bracket 540 fixedly mounted on the rear end of the wheel slide 20. The cylinder 538 contains a slidably mounted piston 541 which is connected to one end of a piston rod 542. The other end of the piston rod is pivotally connected by a stud 543 with a bracket 544 fixedly mounted on the wheel guard cover 536. When fluid under pressure is passed through a pipe 545 into a cylinder chamber 546, the piston 541 will be moved downwardly to swing the guard cover 536 in a clockwise direction from the full line position 536 into the broken line position 536a.

As shown in Fig. 5, a frame 550 straddles the wheel guard 536 and is fixedly mounted thereon. The frame 550 serves as a support for a wheel guard truing apparatus 551 as shown in Figs. 20, 21 and 22. The truing apparatus 551 comprises a base 552 which serves as a support for a longitudinally movable slide 553. An anti-friction slideway 554 is interposed between the base 552 and the longitudinally movable slide 553. A hydraulically operated mechanism is provided for traversing the slide 553 longitudinally comprising a cylinder 555 fixedly mounted on the truing apparatus base 552. The cylinder 555 contains a slidably mounted piston 556 which is connected to one end of a piston rod 557. The other end of the piston rod 557 is fixedly connected to an end cap 558 mounted on the right hand end of the slide 553. When fluid under pressure is passed through a pipe 559 into a cylinder chamber 560, the piston 556 is moved toward the right (Figs. 20 and 25) to traverse the slide 553 toward the right. During this movement of the slide 553 fluid within a cylinder chamber 561 may exhaust through a pipe 562.

The slide 553 serves as a support for a transversely movable truing tool carrier sleeve 565 which is slidably mounted within an aperture 566 formed on the slide 553. The truing tool carrier sleeve 565 supports a truing tool holder 567 having a diamond holder 568 mounted at the lower end thereof. The diamond holder 568 is provided with a pair of spaced diamonds or truing tools 569 and 570 (Fig. 20). The truing tool carrier sleeve 565 is provided with a rectangularly shaped follower 571 (Fig. 20) which is arranged to engage the upper surface of a forming bar 572 which is supported on the truing apparatus base 552. The follower 571 is provided with spaced points 573 and 574 which are shaped and spaced apart to correspond with the shape and spacing of the diamonds 569 and 570 respectively. The weight of the sleeve 565 and the parts supported thereby serves to maintain the follower 571 in operative engagement with the forming bar 572.

In a crankshaft truing operation, it is desirable not only to true the peripheral surface of the grinding wheel but also the radii on each corner of the grinding wheel. As illustrated in Fig. 20, the slide 553 moves longitudinally until the point 574 of the follower 571 engages the vertical face 572a of the forming bar 572, to move the diamond 570 into the left hand side face of the grinding wheel 21. A cam actuated mechanism to be hereinafter described then causes a vertical movement of the sleeve 565 so that the point 574 of the follower 571 riding on the vertical surface 572a of the forming bar 572 causes the diamond 570 to traverse vertically to true the side face of the wheel. When the point 574 reaches the radius at the top of the vertical surface 572a, a corresponding motion is imparted to the diamond 570 to true the radius on the left hand corner of the wheel 21. As soon as the point 574 of the follower rounds the radius on the forming bar 572, the longitudinally movable slide 553 starts traversing toward the right so that the bottom surface of the follower 571 rides on the horizontal surface 572b of the forming bar 572 to cause a traversing movement of the diamond 570 across the peripheral face of the grinding wheel 21. The diamond 570 rides off the peripheral face of the grinding wheel and the diamond 569 then passes across the peripheral face of the grinding wheel 21 which movement continues until the point 573 of the follower 571 engages the radius formed between the horizontal surface 572b and a vertical surface 572c of the forming bar 572. Continued longitudinal movement of the slide 553 causes the diamond 569 to true the radius at the right hand corner of the wheel 21 after which the point 573 of the follower 571 rides down the vertical face 572c of the forming bar 572 so that the diamond 569 trues the right hand side face of the grinding wheel 21.

A cam actuated mechanism is provided for controlling the vertical movement of the sleeve 565. This mechanism may comprise a slidably mounted cam 575 which is slidably supported on the longitudinal slide 553. A hydraulically operated mechanism carried by the slide 553 is provided for shifting the cam 575 longitudinally relative to the slide 553. This mechanism may comprise a cylinder 576 mounted on the slide 553. The cylinder 576 contains a slidably mounted piston 577 which is connected to one end of a piston rod 578, the other end of which is operatively connected to the cam 575. A follower 579 carried by the sleeve 565 rides on the upper surface of the cam 575. When fluid under pressure is passed through a pipe 580 into the left hand end of the cylinder 576, the piston 577 will be moved toward the right so as to cause the cam 575 to move toward the right thereby imparting a vertical motion to the follower 579 and to the sleeve 565 thereby causing a vertical movement of the diamonds 569 and 570 relative to the grinding wheel 21. During this movement fluid within a cylinder chamber at the right hand end of the cylinder 576 may exhaust through a pipe 581. The cam 575 is shaped to cause a gradual vertical movement of the truing tools 569 and 570 to true the side faces of the grinding wheel 21. The cam 575 has a sufficient lift to raise the sleeve 565 and the follower 571 from the position illustrated in Fig. 20 so that the bottom surface of the follower 571 rides on the horizontal surface 572b of the forming bar 572.

A feeding mechanism is provided for advancing the truing tool holder 567 before each pass of the truing tool across the operative face of the grinding wheel. As illustrated in Fig. 21 the upper end of the truing tool holder 567 is provided with a screw thread 585 which meshes with a nut 586 rotatably supported on the upper end of the sleeve 565. A manually operable feed wheel 587 is fixedly mounted on the lower end of a vertically arranged rotatable shaft 582. A small gear 583 is mounted on the upper end of the shaft 582. The gear 583 meshes with a gear 588 which is keyed onto the feed nut 586. It will be readily apparent from the foregoing disclosure that a rotary motion of the feed wheel will be imparted through the mechanism just described to impart a rotary motion to the nut 586 to impart a feeding movement to the truing tool holder 567 and the truing tools 569—570.

A bell crank lever 590 is rotatably supported on the feed nut 586. The bell crank lever 590 supports a small gear 591 (Figs. 21 and 22) on a stud 592. A compression spring 595 serves normally to hold the bell crank lever 590 with a lug 598 in engagement with a stop screw 599. A ball clutch (not shown) is interposed between the gear 591 and the stud 592 which is arranged so that when the bell crank lever 590 is moved in a counter-clockwise direction, the gear 591 is locked to the bell crank lever 590 and imparts a rotary motion to the gear 588. As the slide 553 moves to shift the lug 593 away from either of the dogs 594 or 597, the released compression of the spring 595 serves to rock the bell crank lever 590 in a clockwise direction to position the lug 598 in engagement with the stop screw 599. When a truing operation is started, the slide 553 moves longitudinally toward the right to traverse the truing tool across the face of the grinding wheel 21. This movement continues until the lug 593 on the bell crank lever 590 engages an adjustable dog 594 and continued movement of the slide toward the right rocks the bell crank lever in a counter-clockwise direction to impart a rotary movement to the gear 588 to feed the truing tool downwardly before the next pass of the truing tool. Similarly when the slide 553 approaches the left hand end of its stroke, a cam 596 on the bell crank lever 590 engages an adjustable dog 597 to again rock the bell crank lever in a counter-clockwise direction to impart a feeding movement through the gear 588 to the truing tools.

A piston type control valve 600 is provided for controlling the admission to and exhaust of fluid from the truing tool traverse cylinder 555. The valve 600 is normally held in a left hand end position by means of a compression spring 601. A solenoid S14 is provided for shifting the valve 600 into a right hand end position. As shown in Figure 25 fluid under pressure from the pressure pipe 204 passes through the valve 600, through the pipe 562 into the cylinder chamber 561 to move the piston 556 toward the left so as to traverse the truing tools across the peripheral face of the grinding wheel. During this movement of the truing tools, fluid within the cylinder chamber 560 exhausts through the pipe 559, through a central passage 602 in the valve 600 and passes out through a pipe 603 and through a throttle valve 604 which controls the normal traversing speed of the truing tools. A pipe 605 is connected to the pipe 603 to convey fluid to a bypass valve 606 which is fixedly mounted on the truing apparatus base. The valve 606 is normally urged in an upward direction (Fig. 25) by means of a compression spring 607 to hold a valve stem 608 in operative engagement with a cam 609. The cam 609 is arranged to move longitudinally with the truing tool slide 553. In the position of the parts as illustrated in Fig. 25, a substantially unrestricted exhaust of fluid from the pipe 603 may pass through the pipe 605 and through the bypass valve 606. This allows the truing tool slide 553 to move rapidly until the valve stem 608 rides off the high point on the cam 609 at which time the valve stem 608 moves upwardly under the released compression of the spring 607 to slow down the traversing movement of the truing tool to a truing speed as regulated by the throttle valve 604.

A control valve 610 is provided for controlling the admission to and exhaust of fluid from the cylinder 576. The valve 610 is normally held in a left hand end position by means of a compression spring 611. A solenoid S15 is provided which when energized serves to shift the valve 610 into a right hand end position. As illustrated in Fig. 25 fluid under pressure from the pipe 204 to the valve 610 is controlled by a valve 612. The valve 612 is normally held in a left hand end position by means of a compression spring 613. A solenoid S17 is provided which when energized serves to shift the valve 612 into a right hand end position. The energization of the solenoid S17 is controlled by a normally closed limit switch LS17 which is actuated by a cam bar 614 which moves with the truing tool slide 553. When the truing tool slide 553 starts movement to the right, the cam 614 moves toward the right thereby allowing the limit switch LS17 to close to energize the solenoid S17 so that fluid under pressure from the pipe 204 may pass through the valve 612, through a pipe 615 to the control valve 610. The solenoid S15 has been previously energized so that fluid under pressure passing through the pipe 615 passes through the pipe 580 to start the piston 577 moving toward the right which also moves the cam 575 toward the right so as to impart a vertical movement to the follower 579 to raise the follower 571 vertically up the side face of the form 572. During the movement of the piston 577 toward the right, fluid within the right hand end chamber of the cylinder 576 exhausts through the pipe 581, through the valve 610 and out through a pipe 616, through a throttle valve 617 into the fluid reservoir. It will be readily apparent that by manipulation of the throttle valve 617, the rate of movement of the cam 575 toward the right may be regulated as desired.

An electric counter T2 is provided for initiating a truing operation after any predetermined number of work pieces have been ground. This counter may be of any of the standard well known varieties such as, for example, the Microflex electric counter manufactured by the Signal Electric Company of Moline, Illinois. The counter T2 is operatively connected so that each time a crankshaft to be ground is loaded into the machine, the crankpin to be ground engages the feeler arm 340 to close the limit switch LS6 which closes a circuit to impart a counting impulse to the counter T2. A manually operable switch 618 is provided which when open may render the truing mechanism inoperative if desired. If the switch 618 is closed, after a predetermined number of work pieces have been ground, the timer T2 closes a circuit to simultaneously energize the solenoids S14 and S15 as above explained. The truing tool slide 553 moves toward the right to pass the truing tools across the operative face of the grinding wheel. At the end of the movement of the slide 553 toward the right, a normally open limit switch LS16 is closed to reset the timer T2 thereby breaking the circuit so as to deenergize the solenoids S14 and S15 so that the slide 553 together with the cam 575 will be traversed toward the left to cause a second pass of the truing tools across the peripheral face of the grinding wheel.

A power operated mechanism is provided for imparting a vertical positioning movement for the truing tools 569—570 to facilitate setting up the truing apparatus, and also for repositioning the truing tools when new grinding wheels have been mounted in the machine. This mechanism may comprise a fluid motor 589 (Fig. 21) which is connected to rotate the gear 588 in either direction. A similar mechanism is provided on each of the grinding wheel truing mechanisms at grinding station Nos. 1, 2, 3 and 4.

Grinding wheel-side truing apparatus

Figure 33:
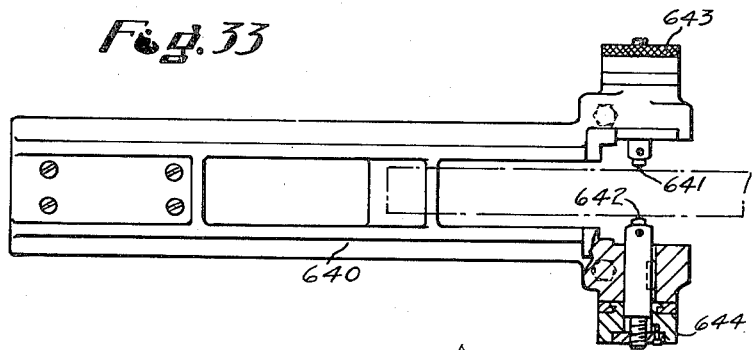
Fig. 33 is a fragmentary plane view of the side truing bracket and truing tools.
Figure 32:
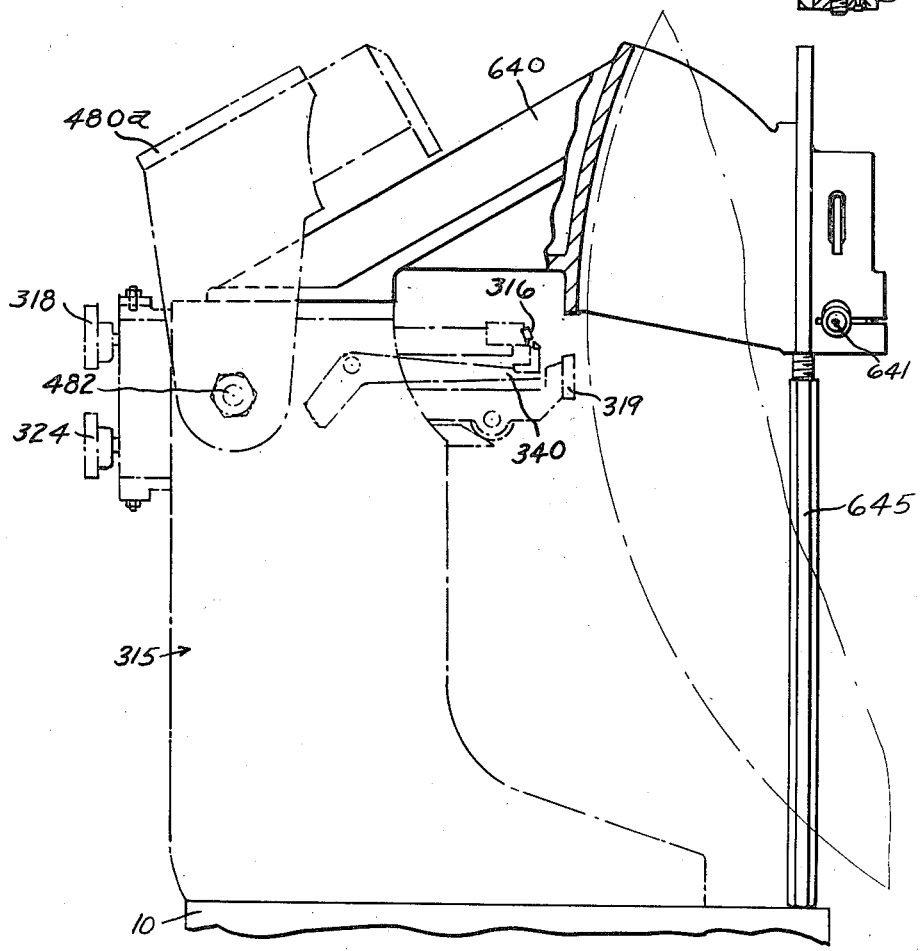
Fig. 32 is a side elevation of one of the steady rests with the spark splitter mechanism in an inoperative position and showing the side truing apparatus in an operative position.

After new grinding wheels have been mounted in the machine, it is desirable to true the side faces thereof to provide side surfaces which are spaced apart by a distance equal to the distance between the checks 4a and 4b of the crankpins. A side truing apparatus frame 640 is arranged to be detachably mounted on the upper surface of each of the steady rests 315, 315a, 315b and 315c. During a side truing operation, the spark splitter arm 480 is shifted in a counterclockwise direction (Fig. 10) into position 480a so that the side truing apparatus may be attached to the upper surface of the steady rests. The side truing apparatus comprising the frame 640 supports a pair of axially aligned spaced diamonds or truing tools 641 and 642. Micrometer nut and screw mechanisms 643 and 644 are provided precisely to position the truing tools 641 and 642 (Fig. 33). An adjustable vertically arranged supporting rod is attached to the side truing apparatus frame 640. The lower end of the rod 645 bears against the upper surface of the base of the machine.

An independent fluid motor 646 is provided for imparting a slow truing feed to the grinding wheels. The motor 647 (Fig. 25) is provided with a gear 647 which meshes with the gear 151 so that a rotary motion of the gear 647 will be imparted through the gear 151 to impart a rotary motion to the feed screw 140.

A suitable control mechanism is provided for controlling the fluid motor 646 so as to cause a continuous traversing movement of the truing tools 641 and 642 (Fig. 33) to facilitate truing the side faces of the grinding wheel 21. A similar unit is provided in connection with each of the truing mechanisms at each of the stations Nos. 1, 2, 3 and 4. This mechanism may comprise a piston type control valve 620 which is normally held in a central or neutral position by balanced springs. A pair of solenoids S13 and S18 are provided for shifting the valve 620 as desired. The valve 620 is connected by a pair of pipes 621 and 622 with the fluid motor 646 so as to control the admission to and exhaust of fluid from the fluid motor 646. Fluid exhausting from the motor 646 passes through the valve 620 and out through a pipe 623, through a throttle valve 624 into the fluid reservoir. By manipulation of the throttle valve 624, the rate of traverse of the truing tools 641 and 642 may be varied as desired. A manually operable switch 625 is provided which is actuated by a control lever 626. The switch 625 is operatively connected to close one or the other of a pair of circuits to energize either the solenoid S13 or the solenoid S18. When the control lever 626 is rocked in a clockwise direction, a circut is closed to energize the solenoid S13 so that the valve 620 is shifted toward the right so that fluid under pressure from the pressure pipe 204 passes through the valve 620 and out through the pipe 621 to the fluid motor 646 to cause a traversing movement of the truing tools in one direction. Similarly when the control lever 626 is rocked in a counterclockwise direction, a circuit is closed to energize the solenoid S14 which shifts the valve 620 toward the left so that fluid under pressure from the pipe 204 passes through the valve 620 and through the pipe 622 to the motor 646 to rotate the same in the opposite direction.

The side truing apparatus control is preferably interlocked with the wheel feed clutch so that a side truing operation cannot be initiated unless the feed clutch is disengaged. A normally open limit switch LS15 is connected in series with the switch 625. The actuating plunger of the limit switch LS15 is arranged in the path of movement of the control lever 641. Before a side truing operation may be initiated, the lever 641 must be swung in a clockwise direction to disengage the feed clutch thereby closing the limit switch LS15 to render the switch 625 operative. It will be readily apparent from the foregoing disclosure that by manipulation of the control lever 626, the truing tools 569 and 570 may be traversed continuously by means of the fluid motor 589 to true the opposite side faces of the grinding wheel 21. This truing operation is accomplished by first truing one side of the wheel by manipulation of the lever 626 after which the truing tool sleeve and the truing tools 569 and 570 are shifted longitudinally to position the second diamond for truing the opposite side face of the grinding wheel 21. The side truing of the wheel 21 is only necessary when a new wheel is mounted on the machine. The side truing operation serves to provide side faces which are spaced from each other by a distance equal to the distance between the shoulders on the crank pin to be ground. After the side faces have been initially trued, the only truing operation required is the truing of the operative peripheral face of the wheel together with the adjacent corners at the opposite side faces thereof.

The grinding cycle at each of the grinding stations No. 1, No. 2, No. 3 and No. 4 are automatically controlled by means of an automatically reset electric timer T1 which may be of any of the well known commercial varieties, such as for example, the Microflex timer manufactured by the Signal Electric Corporation of Moline, Illinois. The timer T1 controls the operation of the grinding wheel feeding mechanism, the work clamping mechanism, the steady rest, and also the transfer-type work loading mechanism so that when each of the four crankshafts has been ground, the work transfer mechanism shifts the crankshafts to the next station and automatically initiates the next grinding operation. This cycle of operation is continuous unless interrupted manually. To facilitate setting up the several grinding wheel stations, it is desirable to provide means for manually and independently controlling the mechanism at each grinding station. As illustrated in the drawings, a selector switch 630 is provided whereby the timer T1 may be rendered inoperative. A manually operable control lever 631 is pivotally supported at each of the grinding stations. The control lever 631 is arranged to close a start switch 632 when rocked in a clockwise direction (Fig. 25) and to open a stop switch 633 when rocked in a counter-clockwise direction.

The operation of this improved crank pin grinding machine will be readily apparent from the foregoing disclosure. To start the machine, a push button switch "A" (momentary contact) is actuated and sets up a holding circuit through the normally closed limit switch LS3 and relay switch R2 to energize the solenoid S1 to shift the valve 348 toward the right so as to pass fluid under pressure to the work loader cylinders 396 so as to actuate the hooks to pick up a plurality of crankshafts. There is a solenoid S1 and valve 348 for controlling each of the work loading units, the solenoids S1 (at each grinding station) are connected in series so that the hooks on each loading unit operate simultaneously to pick up crankshafts. The normally open limit switch LS2 opens as the loader hooks move downwardly. The downward movement of the loader hooks closes the normally open limit switch LS0 to energize the solenoid S2 thereby shifting the valve member 372 toward the left to pass fluid under pressure to the fluid motor 369 to traverse the work loader units 37—38—39—40—41 toward the right simultaneously to transfer a plurality of crankshafts to the next grinding station. The movement of the loaders toward the right continues until the unit 41 engages stop screws 44b on the rail 30, and the plunger 44a on the unit 41 opens the normally closed limit switch LS3. Opening the contacts of limit switch LS3 breaks a holding circuit to deenergize the relay switch R2 and the solenoids S1 (at each grinding station) to actuate the work loader units so as to deposit crankshafts at stations Nos. 1, 2, 3 and 4 and at the discharge station. Upward movement of the loader units closes the limit switch LS2 to energize the solenoid S3 and through the normally closed limit switch LS4 to start the fluid motor 369 in the reverse direction to traverse the loader units 37—38—39—40—41 through an idle stroke toward the left into their initial positions.

During the loading movement of the crankshafts 42 into the pot chucks, the crankpin to be ground is positioned axially relative to the grinding wheel in a manner above described so as to split-the-spark during the grinding operation. As the crankshafts 42 are deposited in the pot chucks (at each grinding station), the crankpin to be ground engages and actuates the feeler arm 340 and closes the normally open limit switch LS6. The closing of limit switch LS6 energizes the solenoid S4 to shift the valve 495 so as to admit fluid under pressure to each of the cylinders 483 simultaneously to swing the arms 480 and the spark splitter cams 507—508 to an inoperative position. This movement of the spark splitter cams serves to close the limit switch LS5 to energize the relay switch CR4 to energize the solenoid S5 (at each grinding station) and, through the normally open contacts of the relay switch R2 sets up a holding circuit for the relay switch CR4. Energizing the solenoid S5 (at each grinding station) shifts the valves 96 simultaneously to clamp all of the crankshafts in the pot chucks.

During actuation of the pot chucks, fluid under pressure operates the pressure switch P1. The normally open contacts 89 of the pressure switch P1 (at each grinding station) are connected in series with the limit switches LS6, so that when pressure is admitted to actuate the pressure switches P1, the electric timer T1 is energized. The energization of the timer T1 energizes the solenoid S6, and also energizes the solenoid S9 through the limit switch LS13 and also energizes the solenoid S10 through the limit switch LS12 (at each grinding station).

Energization of the solenoid S6 (at each grinding station) shifts each of the wheel feed control valves 168 to start a rapid approaching movement of the pistons 166 and the wheel slides 20—22—24—26. The rapid approaching movement continues until the collar 175 (Fig. 25) engages and actuates the valve member 161 to slow down the rapid approaching movement of the wheel slides to a shoulder grinding speed as controlled by the throttle valve 177. The shoulder feed continues until the piston 166 reaches the end of its stroke toward the left.

During the rapid approaching movement of the wheel slides, a collar or dog 176 engages and closes the normally open limit switcsh LS7 to energize the pull-type solenoid S8 and also to energize relay switch R3 and to set up a holding circuit through the relay switch R3 through the normally closed limit switch LS9. In the position of the parts (Fig. 25), the solenoids S8 and S7 and relay switch R3 are all deenergized, and relay switch R is energized. The energizing of the relay switch R3 energizes the push-type solenoid S7 to close the normally closed contacts of the limit switch LS8 and opens the normally open contacts of the limit switch LS1 to deenergize the relay switch R. The normally open contacts of the relay switch R open to deenergize the work brake and the normally closed contacts of the relay switch R close to engage the work driving clutch to start rotation of the crankshafts 42; also during rapid approaching movement of the wheel slides, the collar or dog 176 closes the normally open limit switch LS10 to start the coolant pump driving motor 178 to start the flow of coolant fluid to the grinding wheels and the work being ground. The dog 176 during its movement toward the left also opens the normally closed limit switch LS13 and holds it open until the rearward movement of the wheel slides.

At the same time the solenoids S6 are energized to shift the feed control valves 168 to initiate a rapid approaching movement of the grinding wheel slides, fluid under pressure is also passed to the grinding feed cylinder 180 to start the piston 181 moving toward the right (Fig. 25) to initiate a rotation of the feed screw 140 on each of the grinding stations Nos. 1, 2, 3 and 4. During the initial movement of the piston 181 toward the right fluid under pressure shifts a backlash valve 208 to allow a substantial exhaust of fluid from the cylinder 180 as controlled by a throttle valve 209 to take up any backlash existing in each of the wheel feeding mechanisms. There is a backlash valve 208 in each of the grinding wheel feeding mechanisms.

When the solenoid S9 is deenergized by opening the limit switch LS13, fluid exhausting from the cylinder 180 may pass through a pipe 310, through the control valve 311, through a pipe 312 and through a throttle valve 313 which is adjusted to control the rate of exhaust so as to produce the desired body infeed of the grinding wheels for grinding the cylindrical surface on a crankpin. In this position of the parts the solenoid S10 is energized so that fluid exhausting through the throttle valve 313 may pass through the control valve 327 and pass unrestricted through an exhaust pipe 328. After the body grinding feed has continued for a desired interval, the arm 229 actuated by movement of the feed stop pawl opens a normally open limit switch LS11 to deenergize the solenoid S11 which serves to allow fluid to exhaust from the steady rest cylinders thereby releasing the compression of the springs 332 and 337 which moves the work steadying shoes into supporting engagement with the crankpin being ground.

After a predetermined body grinding feeding of the grinding wheel has been produced, a further rocking movement of the arm 229 (Fig. 25) serves to open the normally open limit switch LS12 so as to deenergize the solenoid S10 after which fluid exhausting through the valve 327 must exhaust through a throttle valve 329 which is adjusted to produce the desired sizing feed of each of the grinding wheels.

When the timer T1 times out, the solenoid S6 is deenergized thereby causing a rapid rearward movement of the wheel slides 20—22—24—26. The timer T1 then automatically resets for the next cycle. During the rearward movement of the wheel slides, the normally closed limit switch LS13 closes ready for the next cycle. Also during the rearward movement of the wheel slides, the normally open limit switch LS10 opens to stop the coolant pump driving motor 178 so as to stop the flow of coolant fluid to the grinding wheels and the crank pins being ground.

During the rearward movement of the wheel slides, the dog or collar 176 rides off the actuating roller of the limit switch LS7 so that it opens to break the circuit so as to deenergize the solenoid S8 thereby breaking a circuit. LS9 maintains relay switch R3 energized until the roller 255 drops into the depression 252 in the cam 250. The limit switch LS9 then opens to break the circuit so as to deenergize the relay switch R3. The normally open contacts of the relay switch R3 open a circuit to deenergize the solenoid S7. The work spindles continue to rotate until the roller 265 drops into the first depression 262 of the cam 251 thereby closing the normally open contacts of the limit switch LS1 to energize the relay switch R. The normally closed contacts of the relay switch R open to declutch the work drive and the normally open contacts of the relay switch R close to actuate the brake to stop rotation of the work driving spindles. At the same time the normally closed contacts of the limit switch LS8 are still closed to energize the solenoid S12 thereby shifting the valve 246 to pass fluid under pressure to the cylinder 240 which serves through the rack 243 to impart a rotary movement to the work spindles which continues until the roller 265 drops into the second depression 263 in the cam 251 which opens the normally closed contacts of the limit switch LS8 to deenergize S12 and thereby return the rack piston toward the left, the free wheeling clutch 245 allowing the work spindles to remain stationary during the return movement of the piston 241. This mechanism just described serves to precisely position the work supporting chucks in predetermined positions to facilitate transfer of the ground crankshafts. Just before the limit switch LS8 opens due to the roller 265 dropping into the second depression 263 of the cam 251, the normally open contacts of the limit switch LS14 are closed momentarily by movement of the rack bar 243 which serves to set up a holding circuit through the normally closed contacts of the limit switch LS3 and the relay switch R2 to start the loaders on the next cycle automatically to pick up crankshafts and transfer them simultaneously to the next station. The cycle of operation continues in the manner above explained until it is desired to stop the machine. The machine may be stopped at any time by actuating a push button stop switch "B" to stop the entire grinding cycle. If a manual operation of the grinding cycle is desired, the selector switch 630 may be turned so that the timer T1 may be actuated by means of a manually operable control lever 631. When the control lever 631 is rocked in a clockwise direction a start switch 632 is closed to energize the timer T1 so as to start a grinding cycle. Similarly if the control lever 631 is rocked in a counter-clockwise direction a stop switch 633 is opened to stop the grinding cycle when desired. There is a timer T1, a selector switch 630 and a control lever 631 at each of the grinding stations so that each grinding station may be independently controlled when desired to facilitate setting up the machine.

When a truing cycle is desired to true the peripheries of the grinding wheels, a switch 618 (at each grinding station) is closed. At this time the clutch coil and counter coil of the electric counter T2 are dead but one set of contacts in the counter are closed so that the closing of switch 618 energizes the solenoids S14 and S15 (at each grinding station) to pass fluid under pressure from the pressure pipe 204 through the valve 600, through the pipe 559 into the cylinder chamber 560 to move the piston 566 toward the right to start a traversing movement of the truing tool. When the follower 571 engages the vertical side face on the forming bar 572, the actuating roller of the limit switch LS17 rides off the high portion of the control bar 614 and drops into the depressed portion thereon so as to close the normally closed contacts of the limit switch LS17 thereby energizing the solenoid S17 and also energizing the solenoid S16 of the automatic feed compensator to impart a compensating downfeed to the truing tool. Energizing the solenoid S17 causes fluid under pressure to pass from the pipe 204 through the valve 612, through the pipe 615, through the valve 610, through the pipe 580 into the left hand end of the cylinder 576 to move the piston 577 toward the right. This movement imparts a movement of the cam 575 toward the right to raise the follower 579 to the center of the radius formed on the cam bar 575. Fluid pressure in the cylinder 555 then moves the follower 571 along the horizontal upper surface of the forming bar 572. The truing tool continues its movement toward the right until the control bar 614 engages the actuating roller of the limit switch LS17 and opens the limit switch to again energize the solenoid S16 to impart a second compensating feed to the truing tool.

After one pass of the truing tool toward the right, the limit switch LS17 opens to deenergize the solenoid S16, at the same time the normally open contacts of the limit switch LS16 are closed as the truing tool slide reaches the right hand end of its stroke to set the counter T2 in operation. The normally closed contacts of the counter T2 open and the normally open contacts close to energize the clutch coil of the counter. This serves to deenergize the solenoids S14 and S15 to start a return stroke of the pistons 556 and 577 toward the left. When the piston 556 moves toward the left, the limit switch LS17 closes to again energize the solenoid S16 for a wheel feed compensation. The closing of the limit switch LS17 also energizes the solenoid S17 to pass fluid through the valve 610, through the pipe 581, to the right hand end of the cylinder 576 so as to move the piston 577 toward the left for the return stroke. At the end of the return stroke, the limit switch LS17 opens to deenergize the solenoids S16 and S17 and the truing cycle stops. This allows the count coil of the electric counter T2 to be operated each time the limit switch LS6 is opened by removal of the crankshaft from each of the grinding stations. After a predetermined number of crankshafts have been ground, the counter T2, at each grinding station counts out and automatically starts a truing cycle, provided the switch 614 is closed. This truing operation is started when the work loaders pick up crankshafts at each of the grinding stations.

When a side truing operation of the grinding wheel is desired, which is usually only when a new wheel has been inserted in the machine, the control lever 626 may be actuated in either direction to energize either the solenoid S13 on the solenoid S18 to cause a traversing movement of the truing tools relative to the grinding wheel to true the side faces of each of the grinding wheels.

It will thus be seen that there has been provided by this invention a grinding machine in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

We claim:

1. In a crankpin grinding machine having a base, a plurality of work supporting and rotating stations thereon, each of said stations having a pair of spaced axially aligned synchronously rotatable pot chucks for supporting the oppositie ends of a crankshaft to be ground, a transversely movable rotatable grinding wheel on each station, each of said stations being arranged to position a different portion of the crankshaft into operative position for a grinding operation, a plurality of spaced transversely movable wheel slides each having a rotatable grinding wheel, each of said wheels being longitudinally positioned for grinding one of the spaced crankpins on said shaft, means on each station automatically to position a crankshaft to be ground in an axial direction relative to said pot chucks so as to precisely position the portion to be ground relative to the grinding wheel, an automatically actuated transfer mechanism including a plurality of spaced work loader units, operative connections between said units, and a longitudinally extending slideway to support said units to facilitate simultaneously transferring work pieces to be ground from a loading station to one of said grinding stations, between said grinding stations, and from the last of said grinding stations to a discharge station.

2. In a crankpin grinding machine, as claimed in claim 1, in combination with the parts and features therein specified in which the transfer mechanism includes a plurality of spaced longitudinally traversable work loader units, and means including a motor simultaneously to traverse said units to transfer a plurality of work pieces being ground to the next station.

3. In a crankpin grinding machine, as claimed in claim 1, in combination with the parts and features therein specified in which each of the work loading units is provided with spaced hooks to engage spaced main bearings of the work piece being ground and a third hook on all except the last of said units arranged to impart a rotary indexing movement to the work piece during the transfer thereof to the next grinding station.

4. In a crankpin grinding machine, as claimed in claim 1, in combination with the parts and features therein specified of an independent grinding wheel feeding mechanism at each of said stations, an independent control mechanism for each of said feeding mechanisms, a cycle control mechanism whereby all of said feed mechanisms may be simultaneously actuated and controlled simultaneously to grind portions on a plurality of work pieces, and means including a selector switch to facilitate independent control of the wheel feed mechanisms.

5. In a crank pin grinding machine, as claimed in claim 1, in which the transfer mechanism includes a longitudinally extending slideway, a plurality of spaced work loader units slidably supported thereon, means including a fluid motor driven mechanism on one of said units simultaneously to traverse all of said units to transfer a plurality of crankshafts between stations, a solenoid-actuated control valve operatively connected to control said motor, spaced work engaging hooks on each of said units, means including an independent fluid motor actuated mechanism on each of said units operatively connected to impart a combined vertical and a swinging movement to said hooks, a solenoid-actuated control valve simultaneously to control all of said latter fluid motors, means including an electric motor synchronously to rotate all of said pot chucks, means including an electric brake-clutch to control starting and stopping said pot chucks in predetermined loading positions, a limit switch actuated in timed relation with said brake-clutch to control said hook actuating motors simultaneously to pick up ground crankshafts, means including a limit switch actuated in timed relation with the movement of said hooks to energize said first solenoid-actuated control valve to traverse said unit simultaneously to transfer a plurality of crankshafts to the next station.

6. In a multiple station crankpin grinding machine having a plurality of spaced grinding stations, each station comprising a pair of spaced axially aligned rotatable pot chucks for supporting opposite ends of a crankshaft to be ground, a hydraulically operated clamping jaw on each of said chucks for clamping a work piece therein, means synchronously to rotate each of said pairs of pot chucks, a transversely movable rotatable grinding wheel for each station, an independent feeding mechanism for each of said grinding wheels, each of said stations being arranged to position a different portion of a crankshaft in operative position relative to the respective grinding wheel, an axial work positioning mechanism on each station precisely to locate the portion of the work piece to be ground relative to the grinding wheel, a work loading station adjacent to said first grinding station, a work discharge station adjacent to the last grinding station, and an automatically actuated transfer mechanism including a plurality of spaced work loader units simultaneously to transfer crankshafts to be ground from the loading station to the first grinding station, between grinding stations and from the last grinding station to the work discharge station.

7. In a multiple station crankpin grinding machine, as claimed in claim 6 in combination with the parts and features therein specified in which the transfer mechanism comprises a plurality of spaced work loader units, each having a pair of spaced hooks arranged to engage spaced cylindrical bearing surfaces on a crankshaft to effect a transfer thereof, a third hook on each of said units arranged to engage a crankpin on the crankshaft rotatably to index said crankshaft when said unit picks up a crankshaft at the start of a transfer operation, means simultaneously to move all of said hooks vertically simultaneously to pick up a crankshaft at each station, and means including a fluid motor simultaneously to traverse said units longitudinally to transfer each of the crankshafts to the next station.

8. In a multiple station crankpin grinding machine, as claimed in claim 6, in combination with the parts and features therein specified in which the work transfer mechanism comprises a longitudinally extending slide bar, a plurality of spaced work loader units slidably mounted thereon, means including a fluid motor on one of said units simultaneously to traverse all of said units to effect a simultaneous transfer of a plurality of work pieces from one station to the next, a pair of spaced vertically movable work engaging hooks on each of said units, means including an independent piston and cylinder on each of said units for moving the hooks vertically, means including a cam mechanism actuated by said piston and cylinder to rock each pair of said hooks about a horizontal axis during vertical movement thereof so that the hooks move in a substantially elliptical path to facilitate picking up a crankshaft from the pot chucks at one station and thereafter to deposit it in the pot chucks at the next grinding station.

9. In a crankpin grinding machine having a base, a pair of spaced aligned rotatable work heads thereon, a pot chuck on each of said heads to support the opposite ends of a crankshaft to be ground, means synchronously to rotate said heads, a transversely movable rotatable grinding wheel on said base positioned to grind a crankpin on said shaft, a feeding mechanism to feed said grinding wheel transversely, a work loading station at one end of said base, a plurality of spaced longitudinally movable work loading units, a pair of spaced hooks on each of said units positioned to engage spaced main bearings on a crankshaft to be ground, a third hook on at least one of said units which is arranged to engage a crankpin on the crankshaft to be ground rotatably to index the crankshaft during the transfer operation to position a crankpin for a grinding operation, means simultaneously to move each set of hooks to pick up a plurality of crankshafts, and means including a motor on one of said units thereafter simultaneously to traverse all of said units to position a crankshaft in said pot chucks and to remove a ground crankshaft therefrom.

10. In a crank pin grinding machine having a base, a grinding station thereon including a pair of axially aligned rotatable pot chucks to support the opposite ends of a crankshaft to be ground, means including a motor synchronously to rotate said pot chucks, a pivotally mounted clamping jaw on each of said chucks, a piston and cylinder on each of said chucks operatively connected to actuate said clamping jaw, a loading station adjacent to said base for supporting a plurality of crankshafts to be ground, a longitudinally traversable work loader unit having a pair of spaced hooks arranged to engage spaced main bearings on a crankshaft, means including a motor actuating mechanism on said unit to pick up a shaft from the loader station, means including a third hook on said unit to impart a rotary indexing movement to the crankshaft as it is picked up from the loading station, means including a motor on said unit to traverse said unit longitudinally into alignment with the pot chucks, means actuated by and in timed relation with said longitudinal positioning movement of the unit to impart a downward movement to the loader unit hooks to position the crankshaft to be ground in the pot chucks, and means including a plunger on one of said clamping jaws to impart a precise rotary indexing movement to the crankshaft during movement of the clamping jaws into a clamped position.

11. In a crank pin grinding machine, as claimed in claim 10, in combination with the parts and features therein specified of an electrically actuated brake-clutch interposed between the motor and pot chucks, a transversely movable wheel slide having a rotatable grinding wheel, means including a piston and cylinder mechanism to impart a transverse feeding movement to said wheel slide, electrically actuated means including a limit switch actuated by and in timed relation with the rearward movement of the wheel slide to actuate said brake-clutch to stop the pot chucks in an upright loading position after a grinding operation, electrically operated means including a limit switch actuated thereby to initiate a downward movement of the work loader hooks to pick up the ground crankshaft and to raise it vertically, and means including a limit switch actuated by and in timed relation with the upward movement of the loader hooks to start the loader traversing motor to shift the ground crankshaft to a discharge station.

12. In a crankpin grinding machine, as claimed in claim 11, in combination with the parts and features therein specified of a pressure switch actuated by and in timed relation with the pot chuck clamps to close a circuit, an electric timer actuated thereby which is operatively connected to control the infeeding movement of the grinding wheel to control the duration of the grinding operation.

13. In a crankpin grinding machine, as claimed in claim 10, in combination with the parts and features therein specified of a grinding wheel truing apparatus including a longitudinally traversable truing tool, a hydraulically operated piston and cylinder operatively connected thereto to impart a longitudinal traversing movement to the truing tool, an electrically controlled feed compensator to impart a transverse feeding movement to the truing tool, a pivotally mounted feeler arm actuated by a work piece as it is loaded into the pot chucks, a limit switch actuated thereby, and an electric counter actuated by said limit switch, a solenoid-actuated control valve for said truing apparatus, and electrical connections between said counter and said solenoid actuated control valve so that after a predetermined number of impulses have been imparted to said counter, a truing operation of the grinding wheel is automatically initiated.

14. In a crank pin grinding machine having a base, a grinding station thereon including a pair of axially aligned rotatable pot chucks to support the opposite ends of a crankshaft to be ground, means including a motor synchronously to rotate said pot chucks, a pivotally mounted clamping jaw on each of said chucks, a piston and cylinder on each of said chucks operatively connected to actuate said clamping jaw, a loading station adjacent to said base for supporting a plurality of crankshafts to be ground, a longitudinally traversable work loader unit having a pair of spaced hooks arranged to engage spaced main bearings on a crankshaft, means including a motor actuated mechanism on said unit to pick up a shaft from the loader station, means including a third hook on said unit to impart a rotary indexing movement to the crankshaft, means including a motor on said unit to traverse said unit longitudinally into alignment with the pot chucks, means actuated by and in timed relation with said longitudinal positioning movement to impart a downward movement to the loader hooks to position the crankshaft to be ground in the pot chucks, a pivotally mounted work indexing arm supported on said base, and means including a piston and cylinder operatively connected to actuate said arm to impart a precise rotary indexing movement to the crankshaft to be ground.

15. In a crankpin grinding machine, as claimed in claim 14, in which a transversely movable wheel slide having a rotatable grinding wheel is provided at each grinding station, means including a piston and cylinder to feed said slide transversely, a solenoid-actuated control valve therefor, an electric timer operatively connected to control said valve so as to control the duration of the grinding operation, and means including a pressure switch actuated by and in timed relation with the pot chuck clamping jaws to energize said timer to provide an interlock to prevent initiating an infeeding movement of the grinding wheel before the crankshaft has been clamped in the pot chucks.

16. In a crankpin grinding machine, as claimed in claim 14, in which a transversely movable wheel slide having a rotatable grinding wheel is provided at each grinding station, means including a piston and cylinder to feed said slide transversely, a solenoid-actuated control valve therefor, an electric timer operatively connected to control said valve so as to control the duration of the grinding operation, an electrically actuated brake-clutch interposed between the motor and pot chucks to control the stopping and starting of the pot chucks, means including a pressure switch actuated by and in timed relation with the pot chuck jaws to energize said timer to initiate an infeeding movement of the grinding wheel and means including a limit switch operatively connected to actuate the motor brake-clutch to start rotation of the pot chucks thereby providing an inner lock to prevent initiating an infeeding movement and a starting of the work rotation before the crankshaft has been clamped in the pot chucks.

17. In a crankpin grinding machine, as claimed in claim 14, in which a pivotally mounted feeler arm is actuated by a work piece during positioning in the pot chucks, a limit switch actuated by said feeler, a solenoid-actuated control valve controlled by said limit switch to admit fluid under pressure to the pot chuck cylinders so as to actuate the clamping jaws, a transversely movable wheel slide having a rotatable grinding wheel at each grinding station, means including a piston and cylinder to feed said slides transversely, a solenoid-actuated control valve therefor, an electric timer operatively connected to control said latter valve so as to control the duration of the grinding operation, and means including a pressure switch connected between the first control valve and the pot chuck cylinders which is actuated by and in timed relation with the pot chuck clamping jaws to energize said timer to prevent actuating the clamping jaws and initiating an infeeding movement except when a crankshaft is precisely positioned in the pot chucks.

18. In a crankpin grinding machine, as claimed in claim 14, in which a solenoid-actuated control valve is provided to control the flow of fluid under pressure to the pot chuck cylinders to clamp or release a crankshaft, a work actuated feeler arm, a limit switch actuated thereby, a relay switch operatively connected to said limit switch to energize said solenoid valve to clamp a crankshaft in the pot chucks, an electrically actuated motor-brake-clutch interposed between the motor and pot chucks, an electrically actuated cam controlled mechanism to facilitate precisely stopping rotation of the pot chucks in a predetermined position, and a limit switch actuated by said mechanism to deenergize the relay switch so as to release said clamping jaws only when the pot chucks are stopped in a predetermined position.

19. In a crank pin grinding machine having a base, a plurality of pairs of aligned rotatable work heads thereon, a pot chuck on each of said heads to support opposite ends of a crankshaft to be ground, each pot chuck having a pivotally-mounted hydraulically-actuated clamping jaw, a plurality of spaced transversely movable rotatable grinding wheels on said base, one grinding wheel for each pair of heads being positioned successively to grind spaced crank pins on a crankshaft, a work loading station at one end of said base, a work discharge station at the other end of said base, a plurality of adjustably spaced longitudinally movable work loader units, means including a motor driven mechanism simultaneously to traverse said units, a pair of spaced hooks on each of said units positioned to engage spaced main bearings on a crankshaft, a third hook on all but the last unit which is arranged to engage a crank pin on the crankshaft to be ground rotatably to index the crankshaft during the transfer operation to position the next pin for a grinding operation, a feeding mechanism to feed each of said wheels transversely, means including a motor driven mechanism on each of said units operatively connected to move each of said sets of hooks through a substantially elliptical path simultaneously to pick up a plurality of crankshafts, and electrically actuated control means thereafter to start the traverse motor simultaneously to traverse all of said units to transfer the crankshafts to the next station.

References Cited in the file of this patent

UNITED STATES PATENTS

| | | |
|---|---|---|
| 1,950,040 | Smith | Mar. 6, 1934 |
| 2,033,449 | Romaine | Mar. 10, 1936 |
| 2,142,050 | Garside | Dec. 27, 1938 |
| 2,233,309 | Groene | Feb. 25, 1941 |
| 2,264,160 | Flygare | Nov. 25, 1941 |
| 2,623,429 | Meyer | Dec. 30, 1952 |
| 2,638,719 | Balsiger | May 19, 1953 |
| 2,653,502 | Meyer | Sept. 29, 1953 |
| 2,704,955 | Kendall | Mar. 29, 1955 |